US005836846A

United States Patent [19]

Hewko et al.

[11] Patent Number: 5,836,846

[45] Date of Patent: Nov. 17, 1998

[54] ELECTRIC SWASHPLATE ACTUATOR FOR STIRLING ENGINE

[75] Inventors: Lubomyr O. Hewko, Clarkston; David Bryan Hanes; Randall Robert Gaiser, both of Ann Arbor, all of Mich.

[73] Assignee: Stirling Thermal Motors, Inc., Ann Arbor, Mich.

[21] Appl. No.: 704,285

[22] Filed: Aug. 28, 1996

[51] Int. Cl.[6] .................... F16H 35/08

[52] U.S. Cl. .................... 475/149; 475/338; 475/339

[58] Field of Search .................... 475/338, 339, 475/341, 149, 151; 60/518; 92/71

[56] References Cited

U.S. PATENT DOCUMENTS

| | | | |
|---|---|---|---|
| 3,812,928 | 5/1974 | Rockwell et al. | 475/149 X |
| 3,956,538 | 5/1976 | Braun | 475/341 |
| 4,030,404 | 6/1977 | Meijer . | |
| 4,145,887 | 3/1979 | Meijer . | |
| 4,168,632 | 9/1979 | Fokker . | |
| 4,235,116 | 11/1980 | Meijer et al. . | |
| 4,258,590 | 3/1981 | Meijer et al. . | |
| 4,294,139 | 10/1981 | Asselman et al. . | |
| 4,425,837 | 1/1984 | Livesay . | |
| 4,532,855 | 8/1985 | Meijer et al. . | |
| 4,885,980 | 12/1989 | Meijer et al. . | |
| 4,994,004 | 2/1991 | Meijer et al. . | |
| 5,435,794 | 7/1995 | Mori et al. | 475/338 X |
| 5,595,089 | 1/1997 | Watanabe et al. | 475/149 X |
| 5,697,862 | 12/1997 | Sommer | 475/339 |

FOREIGN PATENT DOCUMENTS

| | | | |
|---|---|---|---|
| 2667374 | 4/1992 | France | 475/338 |
| 1657808 | 6/1991 | U.S.S.R. | 475/341 |
| 397338 | 8/1933 | United Kingdom | 475/149 |

*Primary Examiner*—Khoi Q. Ta

*Attorney, Agent, or Firm*—Harness, Dickey & Pierce P.L.C.

[57] ABSTRACT

An actuating mechanism for adjusting the swashplate angle in a Stirling cycle engine. A stationary mounted motor is used to drive one member of a planetary gear set. The motion of this member is transmitted through a second planetary gear set to a member connected to the swashplate. In one embodiment, a worm gear powered by a stationary mounted electric motor drives a moveable rear ring gear. The movement of the rear ring gear is transmitted through three rear planet gears and a common sun gear to produce relative movement in a front planet gear carrier. The relative movement of the front planet gear carrier is transmitted through a bevel gear to the swashplate. This embodiment allows the off-line production of swashplate actuator subassembly cartridges that can quickly be journalled to the drive shaft, joined to and properly phased with respect to the swashplate and meshed with a worm gear connected to the stationary electric motor during the assembly of a Stirling engine.

6 Claims, 26 Drawing Sheets

ELECTRIC SWASHPLATE ACTUATOR FOR STIRLING ENGINE

BACKGROUND AND SUMMARY OF THE INVENTION

This invention is related to a heat engine and particularly to an improved Stirling cycle engine incorporating numerous refinements and design features intended to enhance engine performance, manufacturability, and reliability.

The basic concept of a Stirling engine dates back to a patent registered by Robert Stirling in 1817. Since that time, this engine has been the subject of intense scrutiny and evaluation. Various Stirling engine systems have been prototyped and put into limited operation throughout the world. One potential application area for Stirling engines is for automobiles as a prime mover or engine power unit for hybrid electric applications. Such applications place extreme demands on Stirling engine design. Due to the wide acceptance of spark ignition and Diesel engines, to gain acceptance, a Stirling engine must show significant advantages over those types, such as a dramatic enhancement in fuel efficiency or other advantages. In addition, reliability and the ability to manufacture such an engine at a low cost are of paramount importance in automotive applications. Similar demands are present in other fields of potential use of a Stirling engine such as stationary auxiliary power units, marine applications, solar energy conversion, etc.

Stirling engines have a reversible thermodynamic cycle and therefore can be used as a means of delivering mechanical output energy from a source of heat, or acting as a heat pump through the application of mechanical input energy. Using various heat sources such as combusted fossil fuels or concentrated solar energy, mechanical energy can be delivered by the engine. This energy can be used to generate electricity or be directly mechanically coupled to a load. In the case of a motor vehicle application, a Stirling engine could be used to directly drive traction wheels of the vehicle through a mechanical transmission. Another application in the automotive environmental is for use with a so-called "hybrid" vehicle in which the engine drives an alternator for generating electricity which charges storage batteries. The batteries drive the vehicle through electric motors coupled to the traction wheels. Perhaps other technologies for energy storage could be coupled to a Stirling engine in a hybrid vehicle such as flywheel or thermal storage systems, etc.

The Assignee of the present application, Stirling Thermal Motors, Inc. has made significant advances in the technology of Stirling machines through a number of years. Examples of such innovations include development of a compact and efficient basic Stirling machine configuration employing a parallel cluster of double acting cylinders which are coupled mechanically through a rotating swashplate. In many applications, a swashplate actuator is implemented to enable the swashplate angle and therefore the piston stroke to be changed in accordance with operating requirements.

Although the Assignee has achieved significant advances in Stirling machine design, there is a constant need to further refine the machine, particularly if the intended application is in large volume production. For such applications, for example motor vehicles, great demands are placed on reliability and cost. It is well known that motor vehicle manufacturers around the world have made great strides in improving the reliability of their products. The importance of a vehicle engine continuing to operate reliably cannot be overstated. If a Stirling engine is to be seriously considered for motor vehicle applications, it must be cost competitive with other power plant technologies. This is a significant consideration given the mature technology of the spark ignition and Diesel internal combustion engines now predominately found in motor vehicles today.

In the past several decades, significant improvements in exhaust pollution and fuel economy have been made for spark ignition and Diesel engines. However, there are fundamental limits to the improvements achievable for these types of internal combustion engines. Due to the high temperature intermittent combustion process which takes place in internal combustion engines, pollutants are a significant problem. Particularly significant are $NO_x$ and CO emissions. Although catalytic converters, engine control, and exhaust treatment technologies significantly improve the quality of emissions, there remains room for improvement. Fuel efficiency is another area of concern for the future of motor vehicles which will require that alternative technologies be studied seriously. It is expected that the ultimate thermal efficiency achievable with the spark ignition internal combustion engines is on the order of 20%, with Diesel engines marginally exceeding this value. However, in the case of Stirling engines, particularly if advanced ceramic or other high temperature materials are implemented, thermal efficiencies in the neighborhood of 40% to 50% appear achievable. The external combustion process which could be implemented in an automotive Stirling engine would provide a steady state combustion process which allows precise control and clean combustion. Such a combustion system allows undesirable pollutants to be reduced.

In view of the foregoing, there is a need to provide a Stirling cycle engine having design features enabling it to be a viable candidate for incorporation into large scale mass production such as for automobiles and for other applications. The present invention relates to features for a Stirling engine which achieve these objects and goals.

The Stirling engine of the present invention bears many similarities to those previously developed by Assignee, including those described in U.S. Pat. Nos. 4,481,771; 4,532,855; 4,615,261; 4,579,046; 4,669,736; 4,836,094; 4,885,980; 4,707,990; 4,439,169; 4,994,004; 4,977,742; 4,074,114 and 4,966,841, which are hereby incorporated by reference. Basic features of many of the Stirling machines described in the above referenced patents are also implemented in connection with the present invention.

The Stirling engine in accordance with the present invention has a so called "modular" construction. The major components of the engine, comprising the drive case and cylinder block, are bolted together along planar mating surfaces. Piston rod seals for the pistons traverse this mating plane. A sliding contact rod seal can be used which is mounted either to the drive case or cylinder block. The rod seal controls leakage of the high pressure engine working gas at one end of the rod to atmosphere. Sliding contact rod seals provide adequate sealing for many applications. For example, in an automotive engine such an approach might be used. The sliding contact seal would, however, inevitably allow some leakage of working fluid, if only on a molecular level. In solar energy conversion or other applications where the engines must operate for extremely long lives, other types of sealing technology may be necessary to provide a hermetic, ie. non-leaking seal. In the engine of this invention, if other rod sealing approaches are required, it would be a simple matter to insert a plate between the drive case and cylinder block which supports a bellows or other type of hermetic sealing element. Thus the same basic engine componentry could be implemented for various applications.

The Stirling engine of the present invention further includes a number of features which enable it to be manufactured efficiently in terms of component costs, processing, and parts assembly. The drive case and cylinder block feature a number of bores and passageways which can be machined at 90° from their major mounting face surfaces, thus simplifying machining processes. Designs which require castings to be machined at multiple compound angles and with intersecting passageways place more demands on production machinery, tools, and operators, and therefore negatively impact cost.

The Stirling engine according to this invention provides a number of features intended to enhance its ease of assembly. An example of such a feature is the use of a flat top retaining plate which mounts the cylinder extensions and regenerator housings of the engine in place on the cylinder block. The use of such flat surfaces and a single piece retaining plate simplifies machining and assembly. The retaining plate design further lowers cost by allowing a reduction in the high temperature alloy content of the engine. Furthermore, the one piece retaining plate provides superior component retention as compared with separate retainers for each cylinder extension and regenerator housing.

In many past designs of Stirling engines, a large volume of the engine housing is exposed to the high working pressures of the working gas. For example, in many of the Assignees prior designs, the entire drive case was subject to such pressures. For such designs, the entire housing might be considered a "pressure vessel" by certifying organizations and others critically evaluating the engine from the perspective of safety concerns. Thus, the burst strength of the housing may need to be dramatically increased. This consideration would greatly increase the cost, weight, and size of the machine. In accordance with the engine of the present invention, the high pressure working fluid is confined to the extent possible to the opposing ends of the cylinder bores and the associated heat transfer devices and passageways. Thus the high pressure gas areas of the Stirling engine of this invention are analogous to that which is encountered in internal combustion engines, and therefore this Stirling engine can be thought of in a similar manner in terms of consideration for high pressure component failure. This benefit is achieved in the present invention by maintaining the drive case at a relatively low pressure which may be close to ambient pressure, while confining the high pressure working fluid within the cylinder block and the connected components including the cylinder extension, regenerator housing, and heater head.

As a means of enhancing the degree of control of operation of the Stirling engine of this invention, a variable piston stroke feature is provided. In order to achieve this, some means of adjusting the swashplate angle is required. In many past designs, hydraulic actuators were used. These devices, however, consume significant amounts of energy since they are always activated and tend to be costly to build and operate. For these reasons, an electric swashplate actuator is preferred. A prior type of electric swashplate actuator developed by Assignee is described in U.S. Pat. No. 4,994,004. This invention encompasses three embodiments of electric swashplate actuators. A first embodiment features a rotating motor which couples to the swashplate drive through a single planetary gear set. The second and third embodiments incorporate a stationary mounted motor which drives the actuator through a worm gear coupled to pairs of planetary gear sets. In all three embodiments, a high gear reduction is achieved, which through friction in the mechanically coupled element, inhibits the actuator from being back-driven and thus a swashplate angle can be maintained at a set position without continuously energizing the drive motor. Power is applied to the drive motor only when there is a need to change the swashplate angle and hence piston stroke. A brake assembly incorporated in the drive motor assembly may also be used to further inhibit the actuator from being back-driven.

The pistons of the engine are connected to cross heads by piston rods. The cross heads of the engine embrace the swashplate and convert the reciprocating movement of the piston connecting rods and pistons to rotation of the swashplate. The Stirling engine of this invention implements a pair of parallel guide rods mounted within the drive case for each cross head. The cross heads feature a pair of journals which receive the guide rods.

The cross heads include sliders which engage both sides of the swashplate. The clearance between the sliders and the swashplate surfaces is very critical in order to develop the appropriate hydro-dynamic lubricant film at their interfaces. An innovative approach to providing a means of adjusting the cross head bearing clearances is provided in accordance with the present invention.

This invention further encompasses features of the piston assemblies which include a sealing approach which implements easily machined elements which provide piston sealing. A pair of sealing rings are used and they are subjected to fluid forces such that only one of the sealing rings is effective in a particular direction of reciprocation of the piston. This approach reduces friction, provides long ring life and enhances sealing performance.

The combustion exhaust gases after passing through the heater head of the engine still contain useful heat. It is well known to use an air preheater to use this additional heat to heat incoming combustion air as a means of enhancing thermal efficiency. In accordance with this invention, an air preheater is described which provides a compact configuration with excellent thermal efficiency. The surfaces of the preheater exposed to combustion gases can be coated with a catalyst material such as platinum, palladium or other elements or compounds which enable the combustion process to be further completed, thus generating additional thermal energy. The catalyst further reduces exhaust emissions as they do for today's internal combustion engines.

The Stirling engine of this invention incorporates a heater assembly with a number of tubes which are exposed to combustion gases enabling the heat of combustion to be transferred to the working gas within the engine. The typical approach toward constructing such a heater assembly is to painstakingly bend tubing to the proper configuration with each tube having a unique shape. Such an approach is ill-suited for volume production. The requirement of using bent tubing also places significant limitations on heater performance. Material selections are limited since it must have adequate ductility to enable tube stock formed in straight runs or coils to be bent to the proper shape. Such tubing also has a uniform wall thickness and cannot readily be incorporated with external fins to enhance heat transfer area without welding or braising additional parts to the outside of the tube. These steps add to cost and complexity. Moreover, when braising materials are used, temperature limits are placed on the heater tubes to avoid failure of these joints. This temperature limitation also reduces thermal efficiency which tends to increase with combustion temperature. In accordance with this invention, cast heater tubes are provided which can be made in multiples of the same configuration connected together through a manifold. The cast material allows the heater tubes to be subjected to much higher temperatures. In addition, special configurations can be provided to enhance performance. For example, fins of various cross-sectional shape can be provided. Also, the fins need not have a rotationally symmetric configuration, but instead can be designed to consider the fluid mechanics of the fluids moving across them. Through appropriate fin design, it is believed possible to cause the entire perimeter of the heater tubes to be a near uniform temperature despite the fact that fluids are flowing transversely across them. Temperature gradients associated with prior heater tube designs place significant thermal stresses on the tubes, which over time, lead to mechanical fatigue failure.

In the Stirling engine of the type according to the present invention employing four double acting cylinders, there are four discrete volumes of working gas which are isolated from one another (except by leakage across the pistons). In order to enable the engine to operate smoothly and with minimal force imbalances, the mean pressure of each of these four volumes need to be equalized. In accordance with this invention, this is achieved by connecting together the four volumes through capillary tubes. In addition, a system is provided for determining that the mean pressure in each cycle is within a predetermined range. Upon the occurrence of a component failure causing leakage, a significant imbalance could result which could have a destructive effect on the engine. The Stirling engine according to this invention features a pressure control system which unloads the engine upon the occurrence of such failure.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
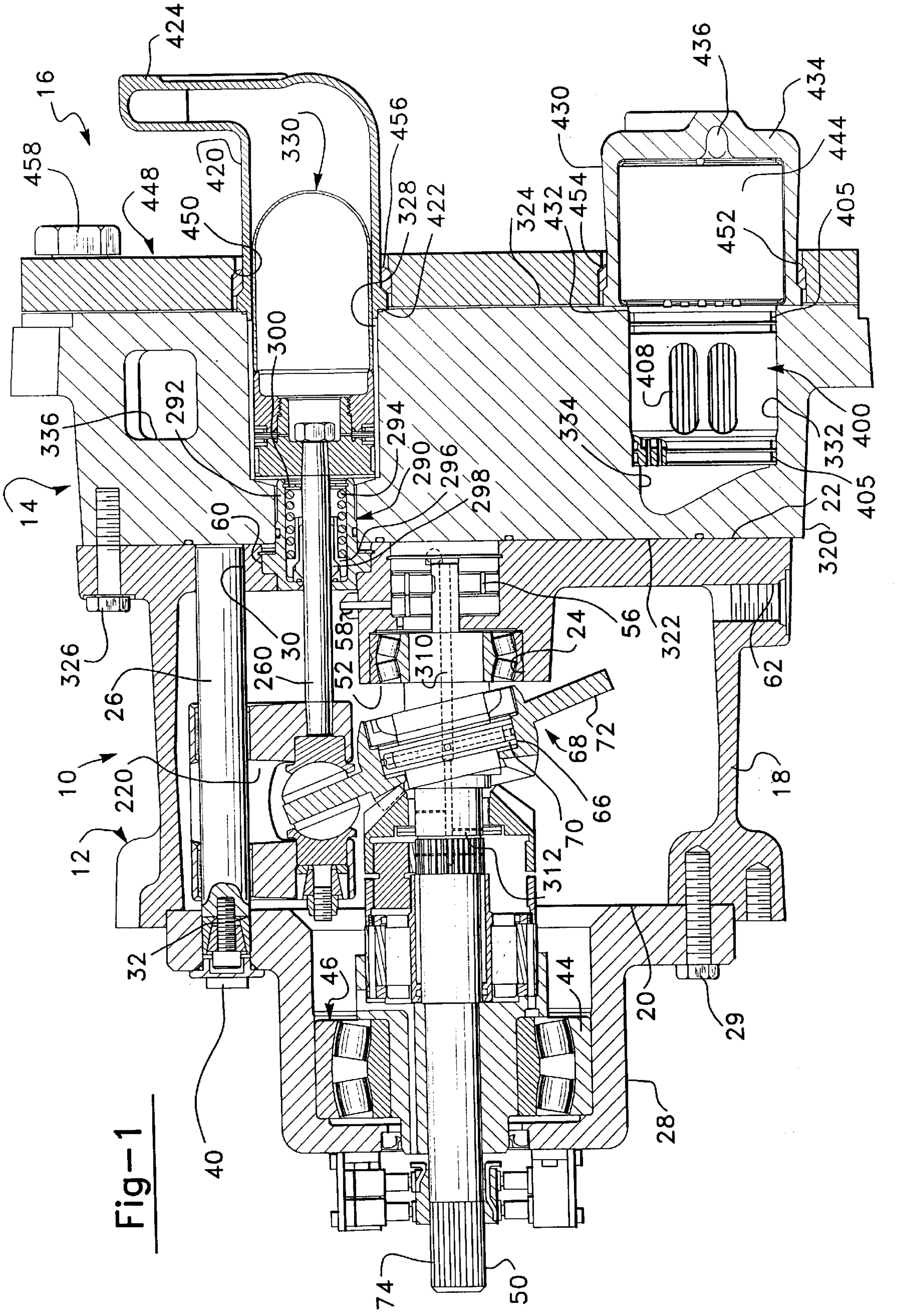
FIG. 1 is a longitudinal cross-sectional view through a Stirling engine in accordance with this invention.

A Stirling engine in accordance with this invention is shown in a completely assembled condition in FIG. 1 and is generally designated by reference number 10. Stirling engine 10 includes a number of primary components and assemblies including drive case assembly 12, cylinder block assembly 14, and heater assembly 16.

Overall Construction

Drive case assembly 12 includes a housing 18 having a pair of flat opposed mating surfaces 20 and 22 at opposite ends. Mating surface 20 is adapted to receive drive shaft housing 28 which is bolted to the drive case housing 18 using threaded fasteners 29. Mating surface 22 is adapted to be mounted to cylinder block assembly 14. Drive case housing 18 has a hollow interior and includes a journal 24 for mounting a drive shaft bearing. Arranged around the interior perimeter of drive case housing 18 is a series of cross head guide rods 26. A pair of adjacent guide rods 26 is provided for each of the four cross heads of the engine (which are described below). As will be evident from a further description of Stirling engine 10, it is essential that adjacent guide rods 26 be parallel within extremely close tolerances.

Figure 3:
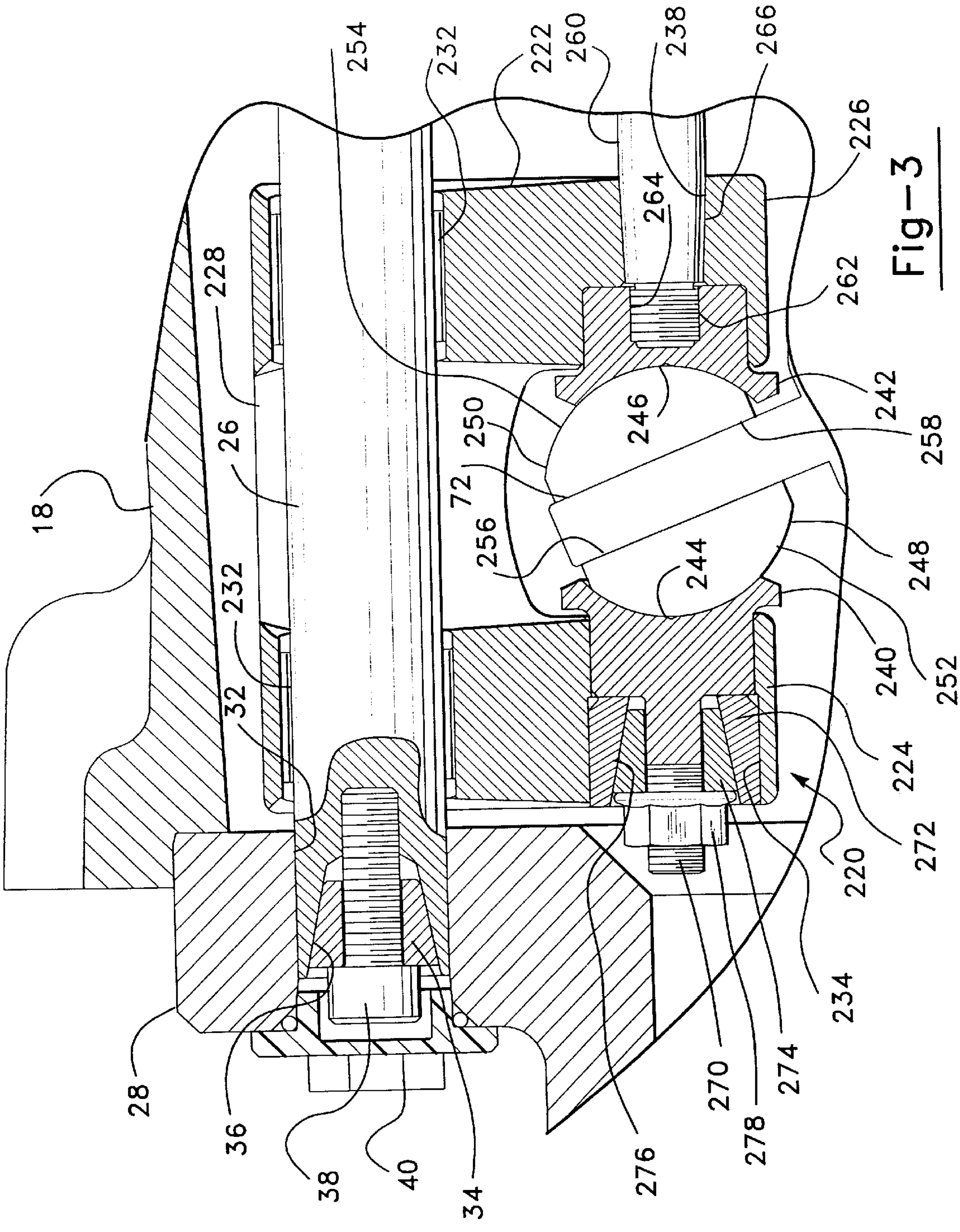
FIG. 3 is an enlarged cross-sectional view taken from FIG. 1 showing in greater detail the cross head assembly of the engine of this invention.

One end of each guide rod 26 is mounted within bores 30 of drive case housing 18. The opposite ends of guide rods 26 are received in bores 32 of drive shaft housing 28. The mounting arrangement for guide rods 26 is shown in FIGS. 1 and 3. One end of each guide rod 26 has a conical configuration bore 36 which terminates at a blind threaded bore. In addition, a series of slits are placed diametrically through the end of guide rods 26 at bore 36 so that guide rod end has limited hoop strength. Cone 34 is inserted within conical bore 36. A threaded fastener such as cap screw 38 is threaded into the threaded bore at the end of guide rod 26. By torquing threaded fastener 38, cone 34 is driven into bore 36 causing the end of guide rod 26 to expand into mechanical engagement with bore 32. This is achieved without altering the concentricity between the longitudinal axis of guide rod 26 and guide rod bores 30 and 32. Cap 40 seals and protects bore 32 and retains lubricating oil within the drive case.

Centrally located within drive shaft housing 28 is journal 44 which provides an area for receiving spherical rolling bearing assembly 46 which is used for mounting drive shaft 50. At the opposite end of drive shaft 50 there is provided spherical roller bearing assembly 52 mounted in journal 24. Spherical bearing configurations are provided for bearing assemblies 46 and 52 to accommodate a limited degree of bending deflection which drive shaft 50 experiences during operation. Drive case housing 18 also provides a central cavity within which oil pump 56 is located. Oil pump 56 could be of various types but a gerotor type would be preferred. Through drilled passageways, high pressure lubricating oil is forced into spray nozzle 58 which sprays a film of lubricant onto the piston rods 260 (described below). In addition, lubricant is forced through internal passages within drive shaft 50, as will be explained in greater detail later.

Drive case 18 further defines a series of four counterbored rod seal bores 60. At a position which would correspond with the lower portion of drive case 18, a sump port 62 is provided. The lubrication system of engine 10 can be characterized as a dry sump type with oil collecting in the interior cavity of drive case 18 being directed to oil pump and returned via suction of oil pump 56, where it is then pumped to various locations and sprayed as mentioned previously.

Drive shaft 50 is best described with reference to FIG. 1. Drive shaft 50 incorporates a variable angle swashplate mechanism. Drive shaft 50 includes an annular swashplate carrier 66 which is oriented along a plane tipped with respect to the longitudinal axis of drive shaft 50. Swashplate 68 in turn includes an annular interior cavity 70 enabling it to be mounted onto swashplate carrier 66. Bearings enable swashplate 68 to be rotated with respect to drive shaft swashplate carrier 66. Swashplate disc 72 is generally circular and planer but is oriented at an angle inclined with respect to that of swashplate cavity 70. By rotating swashplate 68 with respect to drive shaft 50, the angle defined by the plane of disc 72 and the longitudinal axis of drive shaft 50 can be changed from a position where they are perpendicular, to other angular orientations. Thus, rotation of drive shaft 50 causes disc 72 to rotate about an inclined axis. This basic swashplate configuration is a well known design implemented by the Assignee in prior Stirling engine configurations. Drive shaft 50 includes splined end 74 enabling it to be coupled to a load, which as previously stated, may be of various types. Three embodiments of actuators for changing the swashplate angle in a desired manner will be described later.

Swashplate Actuator

Figure 4:
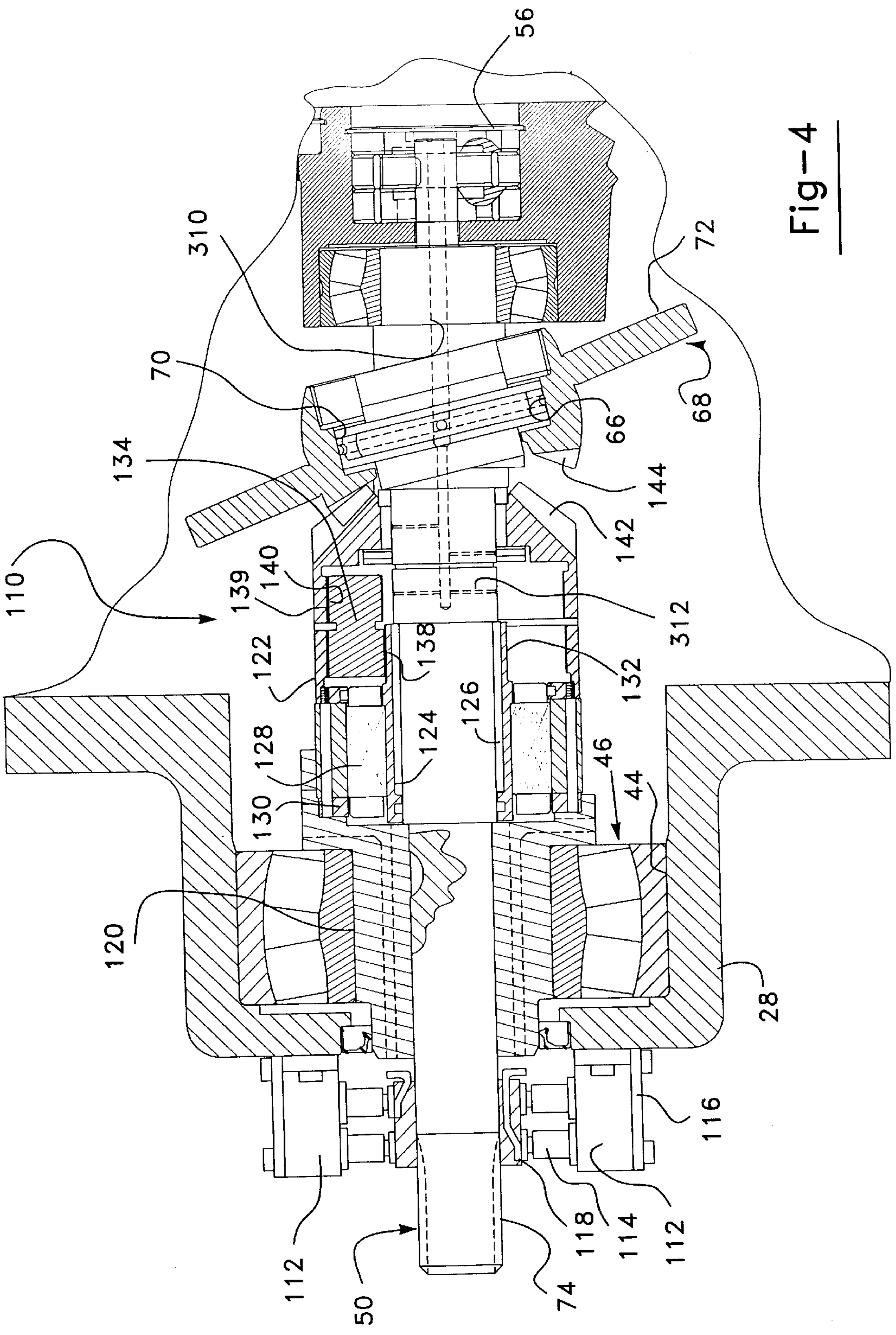
FIG. 4 is a partial cross-sectional view showing an electric swashplate actuator in accordance with a first embodiment of this invention.

A first embodiment of an electric swashplate actuator in accordance with this invention is best shown with reference to FIGS. 1 and 4, and is generally designated by reference number 110. Actuator 110 uses a DC torque motor, a planetary gear system, and beveled gears to accomplish control over swashplate angle. With this embodiment of electric swashplate actuator 110, it is necessary to communicate electrical signals to rotating components. To achieve this, two pairs of slip ring assemblies 112 are provided. Two pairs are provided for redundancy since it is only necessary for one pair to apply electrical power. Each slip ring assembly 112 includes a pair of spring biased brushes 114 mounted to a carrier 116 attached to drive shaft housing 28. Electrical signals are transmitted into slip rings 118 directly attached to drive shaft 50. Electrical conductors are connected to slip rings 118 and run through bearing mount 120 which is keyed to drive shaft 50 such that relative rotation is not possible between these two parts. Bearing mount 120 is connected with motor stator 122 having a number of permanent magnets (not shown) mounted thereto. Motor rotor 124 is journalled onto drive shaft 50 using a self-lubricated journal bearing or needle bearing elements 126 such that they can rotate relative to one another. Electrical signals are transmitted to rotor 124 and its windings 128 via a second set of brushes 130. Accordingly, through the application of DC electrical signals through slip ring assemblies 112, electrical signals are transmitted to rotor windings 128 and thus the rotor can rotate relative to drive shaft 50. By applying voltage in the proper polarity, rotor 124 can be rotated in either direction as desired.

Actuator rotor 124 includes an extension defining sun gear 132. Three planet gears 134 mesh with sun gear 132 and also with teeth formed by stator extension 122 which defines a ring gear. This ring gear is always fixed relative to shaft 50, independent of the swashplate angle adjustment. Thus, as rotor 124 rotates relative to shaft 50, planet gears 134 orbit. Planet gears 134 feature two sections, the first section 138 meshing with sun gear 132, and a second section 139 having a fewer number of teeth meshing with ring gear 140. Revolution of the planet gear 134 causes rotation of ring gear 140 relative to drive shaft 50. Ring gear 140 is directly coupled to a bevel gear 142 which engages a bevel gear surface 144 of swashplate 68. As explained previously, relative rotation of swashplate 68 relative to drive shaft 50 causes an effective change in swashplate angle.

In normal operation, electric actuator 110 is not energized, therefore, sun gear 132 is stationary relative to drive shaft 50. Ring gear 140 is driven by swashplate 68 and both rotate at the same speed. Planet gears 134 carry the torque from ring gear 140 to sun gear 132 and stator ring gear 136. These then carry the torque to bearing mount 120 which in turn carries the torque to shaft 50. Therefore, except when actuated, there is no movement of the gears of electric actuator 110 relative to one another.

Figure 5:
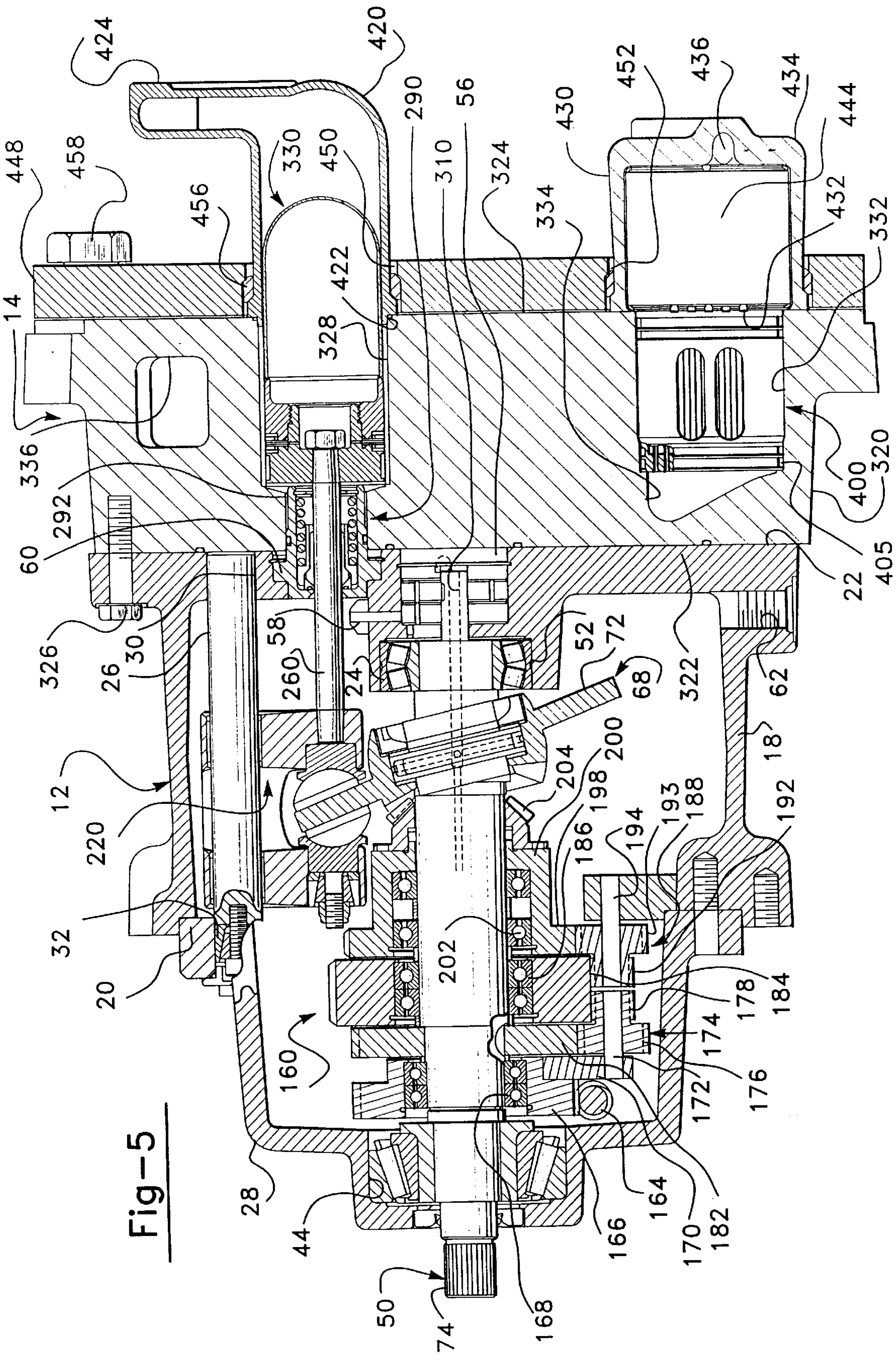
FIG. 5 is a longitudinal cross-sectional view through a Stirling engine according to this invention showing an alternate embodiment of a electric swashplate actuator in accordance with this invention.
Figure 6:
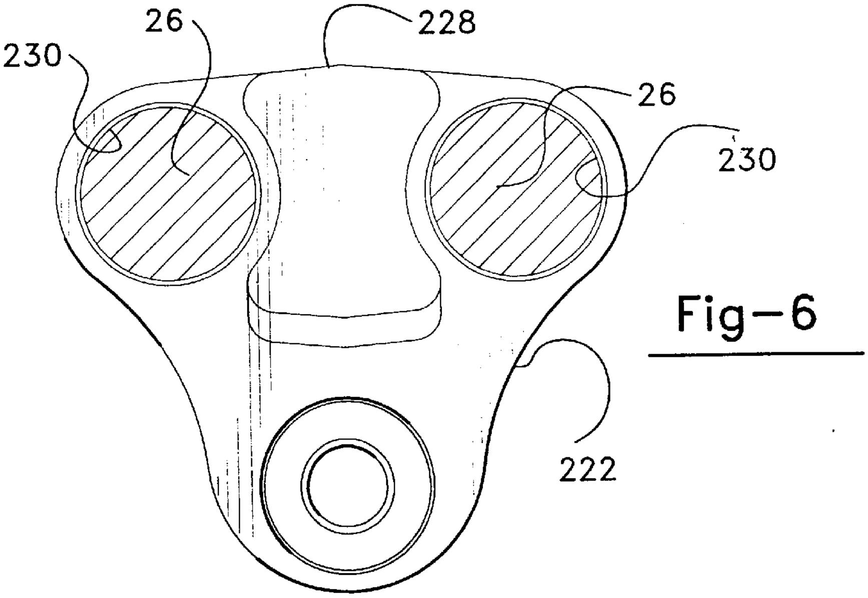
FIG. 6 is a top view of the cross head body showing the guide rods in section.
Figure 7:
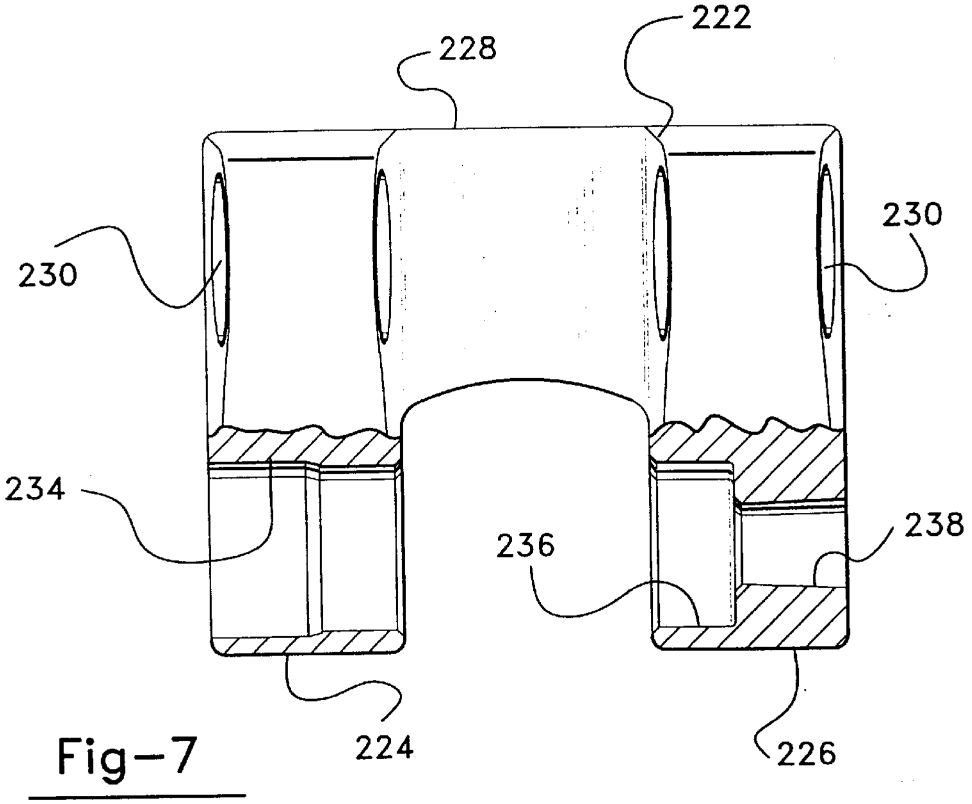
FIG. 7 is a view partially in elevation and partially in section of the cross head body shown in FIG. 6.

Now with reference to FIG. 5, a second embodiment of an electric swashplate actuator according to this invention is shown and is generally designated by reference number 160. The primary distinction of electric actuator 160 as compared with electric actuator 110 is the use of a stationary motor which avoids the requirement of slip rings for communicating power to motor windings. Electric actuator 160 includes a stationary mounted driving electric motor (not shown) which drives worm gear 164 meshing with worm wheel 166. Worm wheel 166 can rotate freely relative to drive shaft 50 through a pair of anti-friction bearings 168. Worm wheel 166 is coupled to carrier arm 170. Shaft 172 is mounted to carrier arm 170 and drives planet gear 174 having a larger diameter toothed segment 176 and a smaller diameter toothed segment 178 which can rotate relative to shaft 172. Larger diameter planet gear segment 176 meshes with fixed gear 182 which is keyed or otherwise fixed to drive shaft 50 for rotation therewith. The smaller diameter planet gear segment 178 meshes with idler gear 184 which rotate relative to the shaft on bearings 186. Idler gear 184 engages with another planet gear set having planetary gears 188 having a smaller diameter segment 192 and a larger diameter segment 193. Planet gear 188 rotates about shaft 194. Shaft 194 is grounded to drive case housing 18. Larger diameter planet gear segment 193 meshes with sun gear 198 which is fixed to collar 200 which rotates relative to shaft 50 on bearings 202. Collar 200 is connected to bevel gear 204 which meshes with swashplate bevel gear 144.

In normal operation the actuator driving motor is not turning. Accordingly, worm 164 and worm wheel 166 are both stationary relative to drive case 18. Sun gear 198 is driven by the swashplate and both rotate at the same speed. Sun gear 198 causes the driven planet gear 188 to rotate about its axis which is held stationary to the drive case 18. This in turn causes idler gear 184 to rotate relative to shaft 50. The speed of idler gear 184 relative to the shaft is dependant on the sizes of the gears used. Fixed gear 182 meshes with the planetary gear 174. Because fixed gear 182 and sun gear 198 are the same size, planet gear 174 does not revolve around the drive shaft axis. However, when worm 164 is rotated, a gear reduction acting through the two planetary gear sets causes bevel gear 204 to rotate relative to drive shaft 50, thus changing the swashplate angle.

Figure 29:
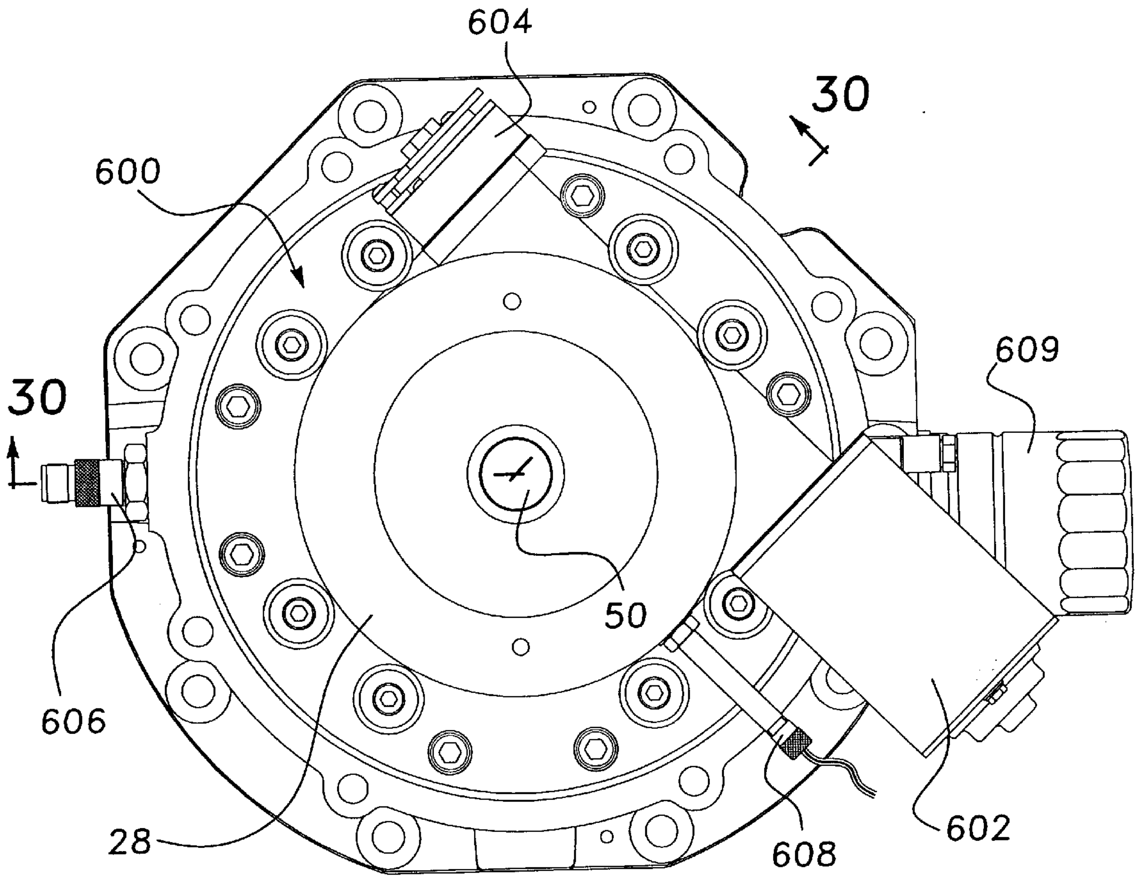
FIG. 29 is an end view of the drive case assembly incorporating an alternative embodiment of the swashplate actuator assembly taken from the output shaft end of the drive case particularly showing the stationary electric motor and sensor housings.

A third embodiment for the electric swashplate actuator is shown in FIG. 29 and is generally designated as reference number 600. This embodiment incorporates a stationary electric motor as described in the prior embodiment and also utilizes two planetary gear assemblies of identical planetary gear sets incorporated into a self-contained cartridge-type assembly.

In FIG. 29, electric motor 602 is mounted to drive shaft housing 28. Motor brake assembly 604 stops the rotation of electric motor 602 when it is deenergized and inhibits electric motor 602 from being backdriven. Bevel gear sensor housing 606, drive shaft sensor housing 608 and oil filter 609 are also visible from this perspective. As described below, data from the bevel gear sensor and drive shaft sensor are used to determine the incline angle of the swashplate as the motor runs.

Figure 30:
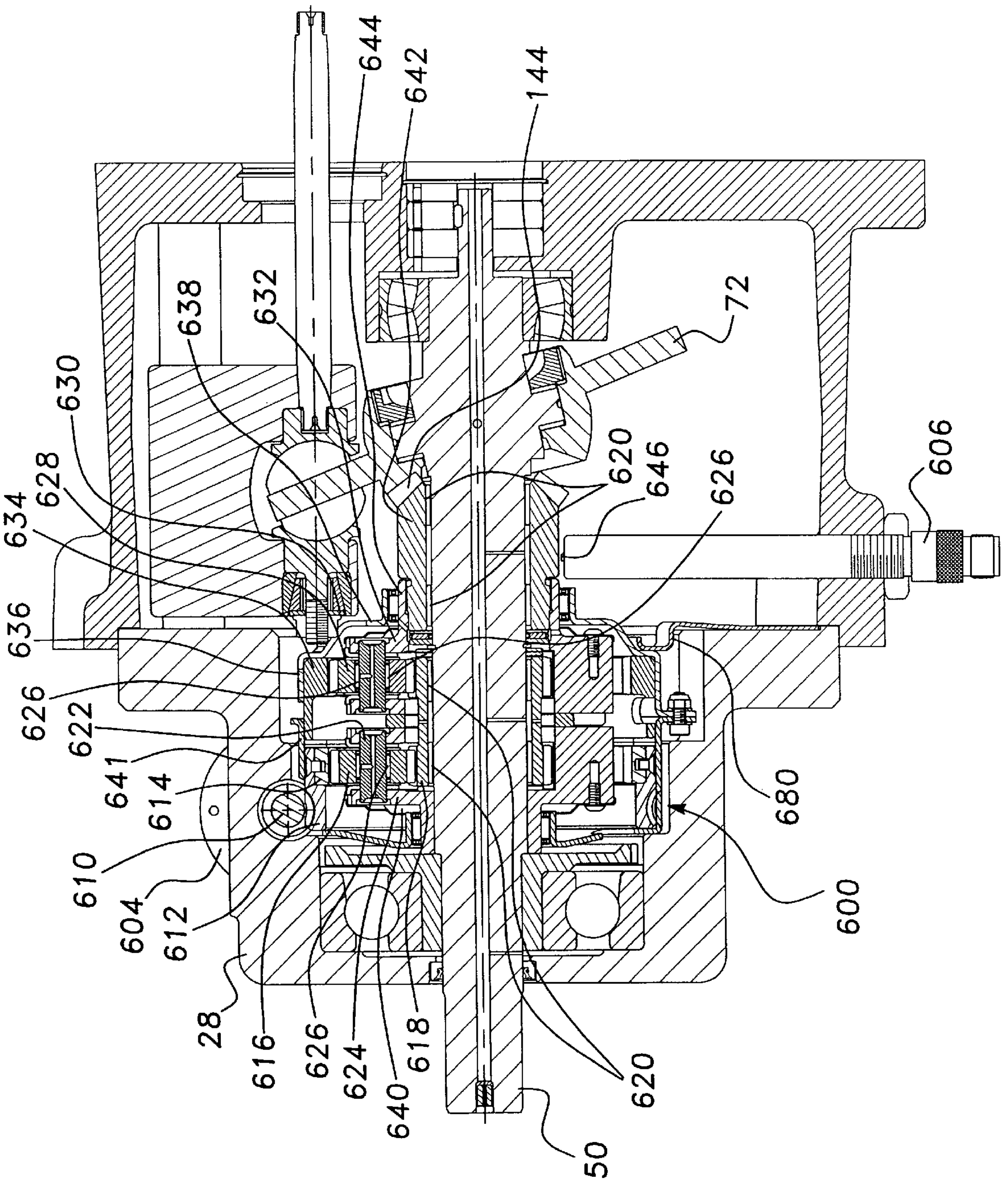
FIG. 30 is an enlarged cross-sectional view taken along line 30—30 from FIG. 29 showing internal components of the swashplate actuator assembly.

FIG. 30 shows the inner workings of swashplate actuator 600. The electric motor drives worm gear 610 which meshes with worm wheel 612. The inside housing of motor brake assembly 604 is also visible from this perspective. Worm wheel 612 is fastened to actuating ring gear 614. Three rear planet gears 616 (also referred to as pinion gears), only one of which is visible from this perspective, mesh with both actuating ring gear 614 and sun gear 618. A pair of journal bushings 620 are provided to allow sun gear 618 to rotate relative to drive shaft 50. Each of the rear planet gears 616 rotates about a rear pinion shaft 622 which is supported by and fixed to a single rear pinion carrier 624 (the pinion shafts and associated pinion carrier are also referred to as a planet gear carrier). Radial needle roller bearings 626 between rear planet gears 616 and rear pinon shafts 622 allow rear planet gears 616 to rotate freely around rear pinon shafts 622. Rear pinion carrier 624 is attached to and does not rotate relative to drive shaft 50. Sun gear 618 also meshes with three front planet gears 628, only one of which is visible from this perspective, which are identical to rear planet gears 616. Front planet gears 628 are supported by front pinion shafts 630 (identical to rear pinion shafts 622) which are in turn supported by and fixed to a single front pinion carrier 632. Radial needle roller bearings 626 between front planet gears 628 and front pinon shafts 630 allow each of the front planet gears 628 to rotate freely around the associated front pinon shafts 630. All three front planet gears 628 also mesh with a single fixed ring gear 634 which is attached to front actuator housing 636. Front oil diverter plate 638, which assists in the proper circulation of lubricants in the mechanism, is attached to front pinion carrier 632. Rear oil diverter plate 640, which also assists in the proper circulation of lubricants in the mechanism, is attached to rear pinion carrier 624. Rear actuator housing 641 is fastened to front actuator housing 636 and constitutes the final major component of swashplate actuator 600. Tab sections in rear actuator housing 641 and front actuator housing 636 mate with corresponding recess sections in drive shaft housing 28 and the contact between these sections prevents rear actuator housing 641 and front actuator housing 636 from rotating with respect to drive shaft housing 28. To prevent swashplate actuator 600 from being incorrectly oriented during assembly, the tab sections in rear actuator housing 641 and front actuator housing 636 are asymmetrically placed, allowing swashplate actuator 600 to be installed in only the correct orientation.

Front pinion carrier 632 is connected to bevel gear 642 by corresponding mating fine toothed spline 644 portions. A spline is used in this area because a stackup of the tolerances of the components of swashplate actuator 600 shows that there must be a certain degree of tolerance allowed in the angular orientation of the spline portion of front pinion carrier 632 with respect to the portion of rear pinion carrier 624 attached to drive shaft 50. The spacing of the teeth of the fine toothed spline 644 corresponds to the relative movement that must be allowed in the angular orientation of the spline portion of front pinion carrier 632 with respect to the portion of rear pinion carrier 624 attached to drive shaft 50 to allow all of the components of swashplate actuator 600 to be properly assembled if the components of swashplate actuator 600 are at the extreme range of their allowed tolerances. Another pair of journal bushings 620 is provided between bevel gear 642 and drive shaft 50 to allow bevel gear 642 to rotate about drive shaft 50. Bevel gear 642 meshes with swashplate bevel gear 144 and the rotation of bevel gear 642 about drive shaft 50 causes the incline angle of swashplate 72 to change.

Also visible from this perspective is bevel gear sensor housing 606 and the exposed section of bevel gear sensor 646. To monitor the incline angle of swashplate 72 while the engine is running, and therefore the stroke distance of the pistons, pulses from bevel gear sensor 646, which detects a feature on bevel gear 642, and a drive shaft sensor (not shown), which detects a feature on a trigger disk (not shown) directly connected to drive shaft 50, are compared and the phase difference between the pulses is calculated. Because the swashplate incline angle is directly related to the phase difference between the pulses from bevel gear sensor 646 and the drive shaft sensor, the current swashplate incline angle can be calculated directly from this phase difference while the engine is running.

In an alternative embodiment of the swashplate actuator, the worm wheel is eliminated and the worm gear drives the actuating ring gear directly.

Figure 31:
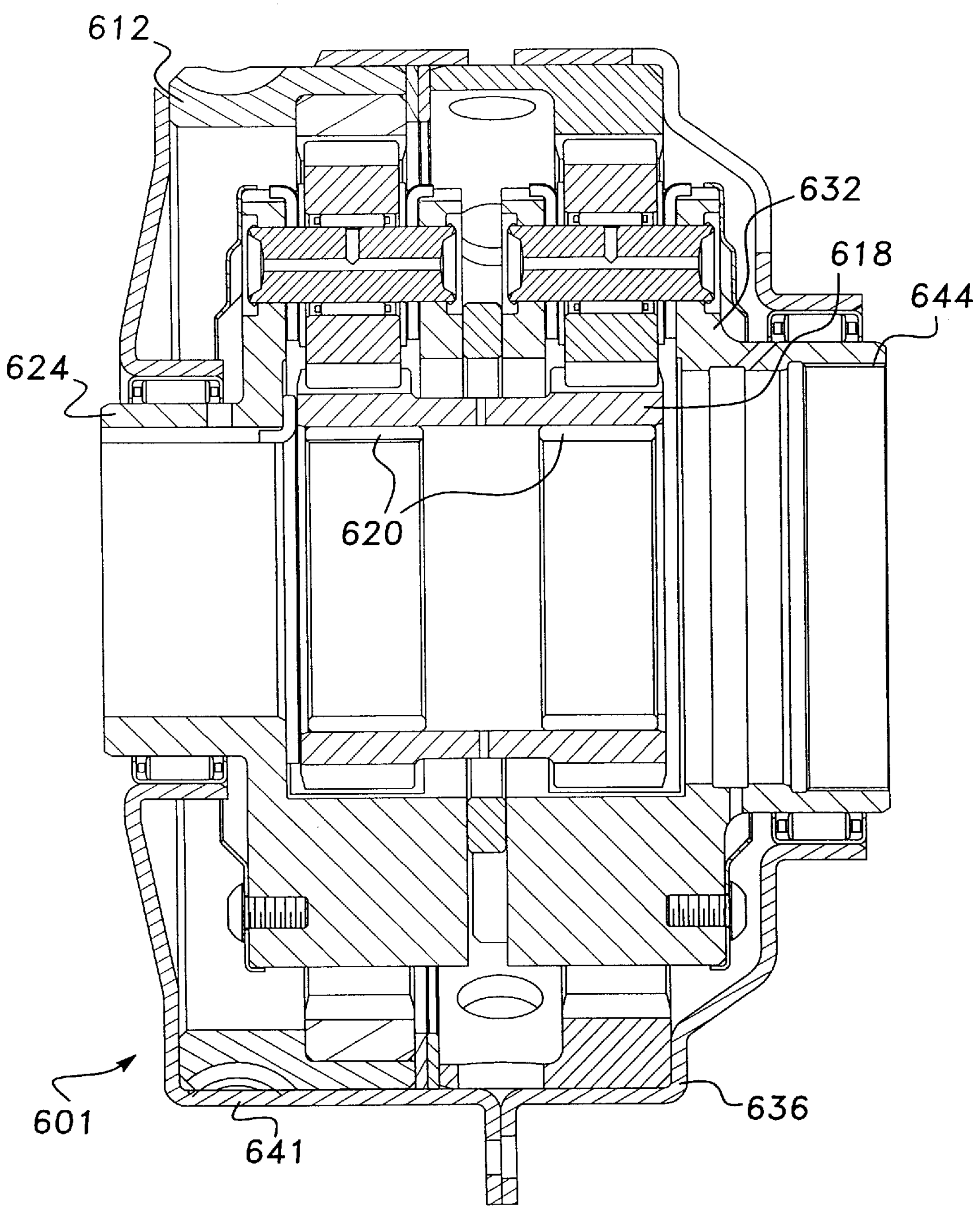
FIG. 31 is an enlarged cross-sectional view of the swashplate actuator assembly cartridge.

FIG. 31 shows the compact assembly characteristics of cartridge swashplate actuator subassembly 601 that includes all of the rapidly rotating parts of this embodiment of swashplate actuator 600. This view emphasizes the modular construction of cartridge swashplate actuator subassembly 601 and shows how it can be assembled off-line and installed as a complete component when Stirling engine 10 is being assembled. Cartridge swashplate actuator subassembly 601 contacts the remaining components of Stirling engine 10 in only six places. Rear pinion carrier 624 becomes fixed to and rotates with drive shaft 50. Journal bushings 620 contact drive shaft 50 and allow sun gear 618 to freely rotate about drive shaft 50. Worm wheel 612 meshes with and is driven by worm gear 610. A fine toothed spline 644 section of front pinion carrier 632 mates with a fine toothed spline 644 section of bevel gear 642. The tab sections of rear actuator housing 641 and front actuator housing 636 mate with corresponding recess sections in drive shaft housing 28. The rear edge of rear actuator housing 641 contacts drive shaft housing 28, which acts to locate the axial position of cartridge swashplate actuator subassembly 601 properly. Proper axial positioning of the cartridge is important to properly locate worm wheel 612 with respect to worm gear 610. Only in these six areas do the components of cartridge swashplate actuator subassembly 601 contact the other components of the Stirling engine.

Figure 32:
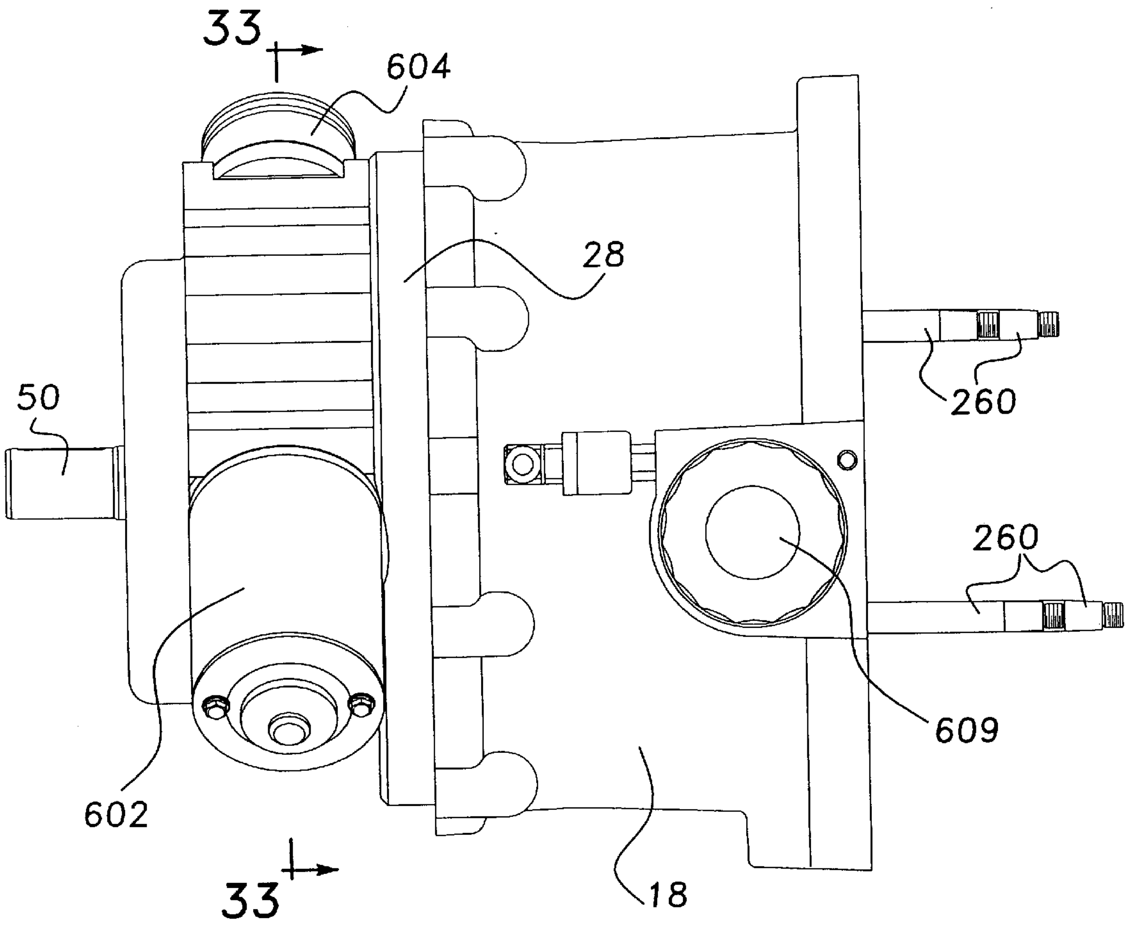
FIG. 32 is a side perspective view of the engine drive shaft housing taken perpendicularly from the output end of the drive shaft.

FIG. 32 shows a side perspective view of the engine drive shaft housing. Visible from this perspective are drive shaft 50, drive shaft housing 28, electric motor 602, motor brake assembly 604 and oil filter 609.

Figure 33:
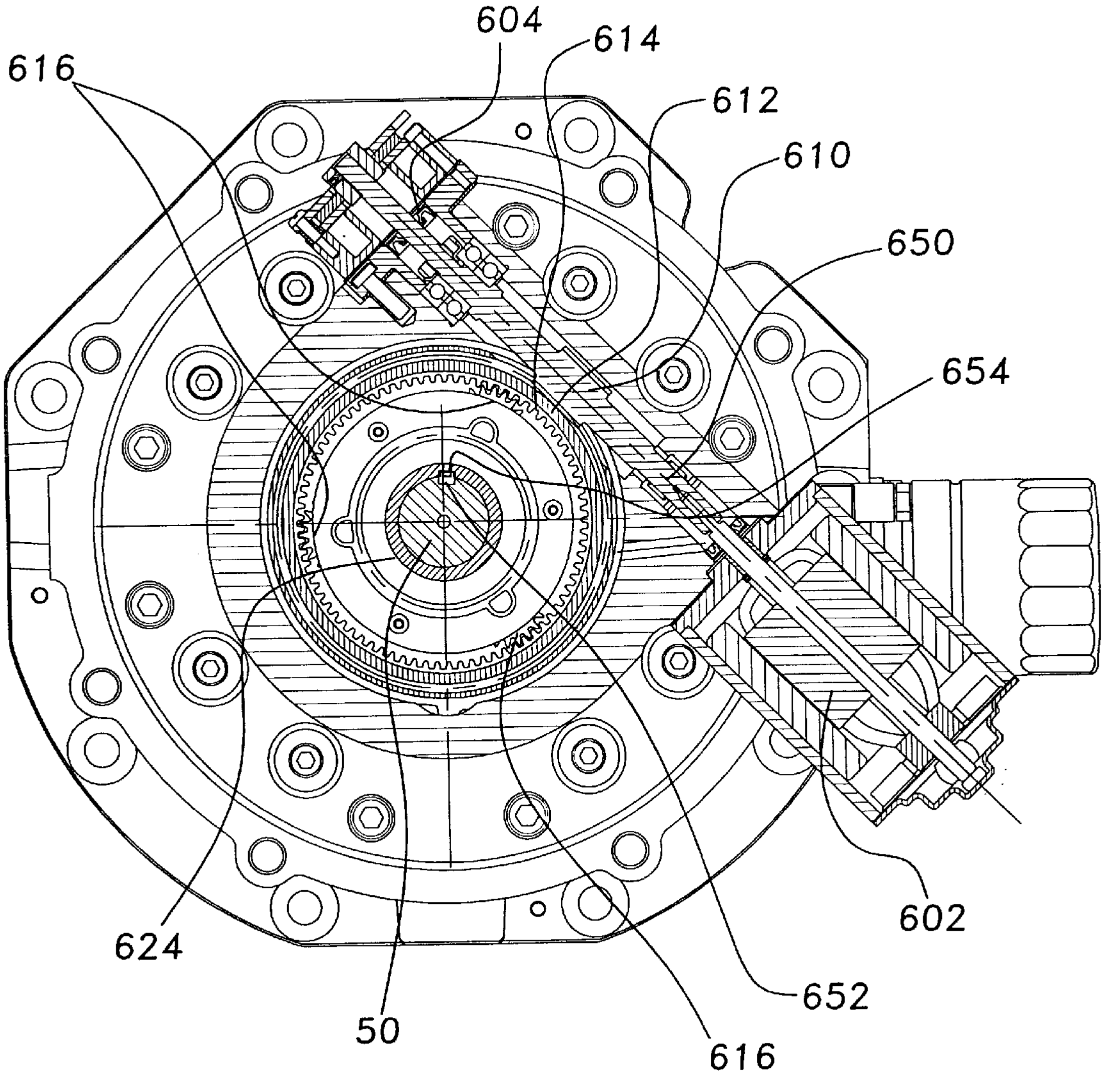
FIG. 33 is an enlarged cross-sectional view taken along line 33—33 from FIG. 32 showing internal components of the worm drive shaft and motor of the swashplate actuator assembly.

FIG. 33 is a cross sectional view of electric motor 602 and its associated drive mechanism taken along line 33—33 from FIG. 32. Electric motor 602 turns worm shaft 650 which has a worm gear 610 section. Worm gear 610 meshes with worm wheel 612. Worm wheel 612 is fastened to actuating ring gear 614. Actuating ring gear 614 meshes with three rear planet gears 616 which are spaced 120° apart from each other around the teeth of actuating ring gear 614. Motor brake assembly 604 is connected to worm shaft 650 to inhibit electric motor 602 and swashplate actuator 600 from being back-driven. Also visible from this perspective is the drive shaft slot 652 portion of drive shaft 50 and the rear pinion carrier key 654. The physical interference of rear pinion carrier key 654 against the walls of drive shaft slot 652 and a cutout section of rear pinion carrier 624 prevents rear pinion carrier 624 from rotating about drive shaft 50 after rear pinion carrier key 654 has been installed.

Figure 34:
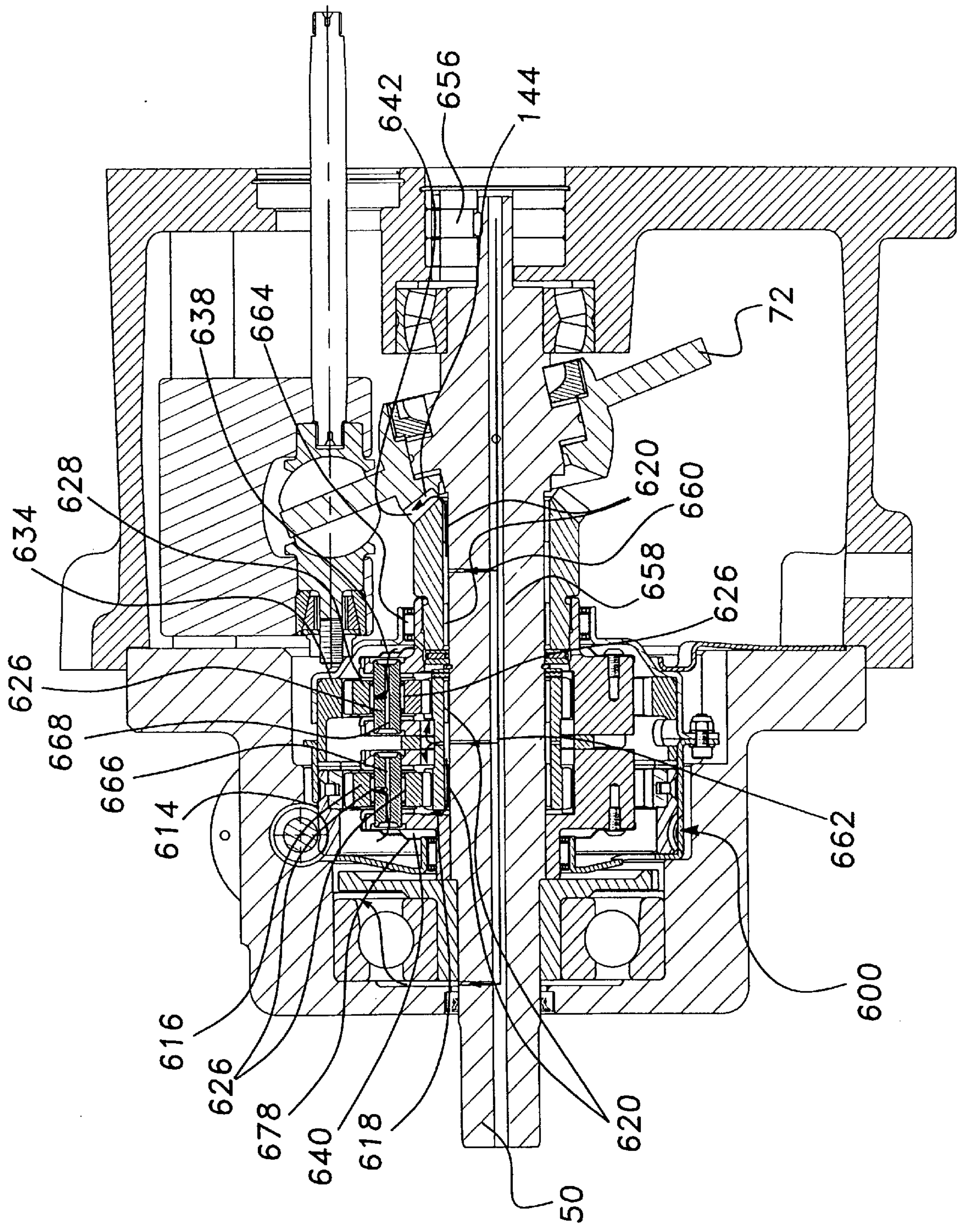
FIG. 34 is a lubrication schematic of the swashplate actuator assembly.

FIG. 34 illustrates the flow of lubricants through the components of swashplate actuator 600. An oil supply 656 located at the far end of drive shaft 50 sends oil under pressure through a central oil channel 658 in drive shaft 50. From central oil channel 658, the oil passes through side oil channels 660 and 662 and into the components of swashplate actuator 600. Oil passing through side oil channel 660 passes under journal bushings 620, lubricates the contact surface between bevel gear 642 and swashplate bevel gear 144. Another portion of the oil passing through side oil channel 660 and under journal bushings 620 travels through a hole in bevel gear 642. A portion of this oil passes through a hole in front pinion carrier 632 and lubricates front cartridge needle roller bearing 664. Front cartridge needle roller bearing 664 acts to pilot swashplate actuator cartridge 601 to drive shaft 50. Another portion of this oil passes through another hole in front pinion carrier 632, is diverted by front oil diverter plate 638, passes through front pinion oil channel 668, and lubricates the front radial needle roller bearings 626. Oil passing through side oil channel 662 lubricates journal bushings 620, and the contact surfaces between rear planet gears 616 and sun gear 618 and between front planet gears 628 and sun gear 618. A portion of the oil passing through side oil channel 662 and journal bushings 620 is diverted by rear oil diverter plate 640, passes through rear pinion oil channel 666, and lubricates the rear radial needle roller bearings 626. Although the lubrication system in swashplate actuator 600 is passive, through the use of oil diverter plates 638 and 640, all moving surfaces in the assembly are lubricated.

Figure 35:
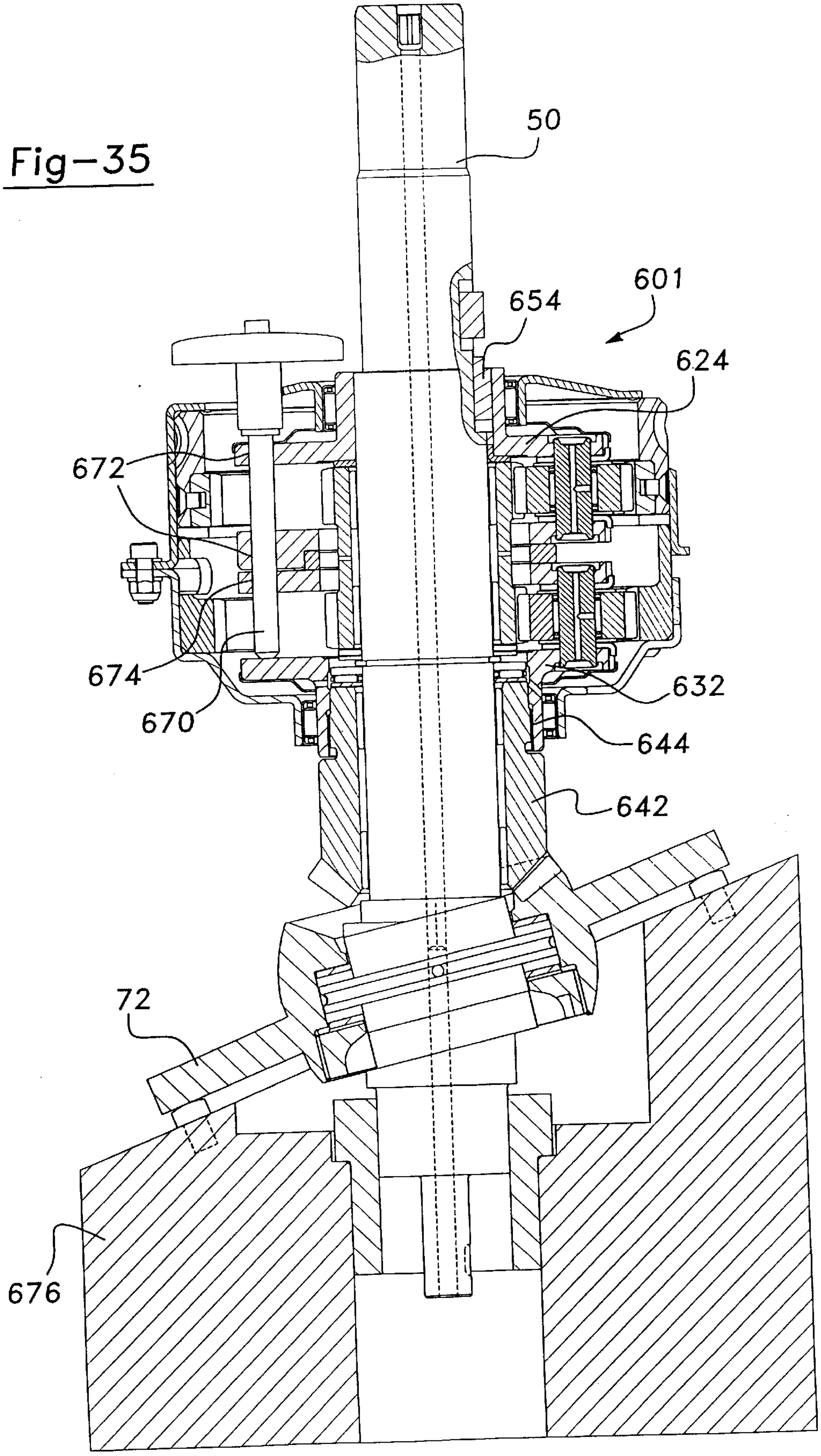
FIG. 35 is a cross-sectional view of the swashplate actuator assembly as it is mated to the swashplate bevel gear, particularly showing the actuator alignment pin and the swashplate positioning fixture.

FIG. 35 illustrates how the relative position of cartridge swashplate actuator subassembly 601 is properly phased with the relative position of swashplate 72 when cartridge swashplate actuator subassembly 601 is installed. As described above, in the design of Stirling engine 10, a maximum piston stroke distance has been provided for. This maximum piston stroke distance corresponds to a certain maximum swashplate 72 incline angle. Cartridge swashplate actuator 601 has been designed to allow for the movement of swashplate 72 with respect to drive shaft 50 from the vertical (no stroke) position to the maximum incline angle (maximum stroke) position. To assure that the angular inclination of swashplate 72 and the angular adjustment of cartridge swashplate actuator subassembly 601 are properly phased with respect to each other, actuator positioning pin 670 is inserted through two rear pinion carrier alignment holes 672 in rear pinion carrier 624 and through front pinion carrier alignment hole 674 in front pinion carrier 632. As discussed above, a certain amount of play must be allowed in the angular orientation of the spline portion of front pinion carrier 632 with respect to the portion of rear pinion carrier 624 to allow all of the components of cartridge swashplate actuator subassembly 601 to be properly assembled. Actuator positioning pin 670 assures that front pinion carrier 632 and rear pinion carrier 624 are properly aligned, but it also allows for the required amount of angular variability that has been designed into the assembly. Swashplate 72 is then placed in swashplate fixture 676 that fixes the incline angle of swashplate 72 with respect to drive shaft 50. Cartridge swashplate actuator subassembly 601 is then placed over drive shaft 50 and the fine toothed spline 644 portion of front pinion carrier 632 is moved into engagement with the fine toothed spline 644 section of bevel gear 642. After swashplate actuator subassembly 601 is placed over drive shaft 50, rear pinion carrier 624 is fixed to drive shaft 50 by rear pinion carrier key 654 and because actuator positioning pin 670 fixes the position of rear pinion carrier 624 with respect to front pinion carrier 632, within the amount of angular variability designed into the assembly, front pinion carrier 632 has a fixed and repeatable position with respect to drive shaft 50, within the amount of angular variability designed into the assembly. Swashplate 72 is in a fixed and repeatable position with respect to drive shaft 50 because it is held by swashplate fixture 676 and therefore bevel gear 642 has a fixed and repeatable position with respect to drive shaft 50. When the fine toothed spline 644 section of front pinion carrier 632 of cartridge swashplate actuator subassembly 601 is then mated with the fine tooth spline 644 section of bevel gear 642 connected to swashplate 72, the angular inclination of swashplate 72 and the angular adjustment of cartridge swashplate actuator subassembly 601 are properly phased with respect to each other, within the precision allowed by the stackup of tolerances of the components of cartridge swashplate actuator subassembly 601.

When electric motor 602 is not energized, worm gear 610, worm wheel 612 and actuating ring gear 614 are stationary with respect to drive shaft housing 28. Swashplate 72 drives swashplate bevel gear 144, bevel gear 642, front pinion carrier 632, three front pinion shafts 630, three front planet gears 628 and sun gear 618. Sun gear 618 also drives three rear planet gears 616. Front planet gears 628 and rear planet gears 616 rotate at the same speed and in the same direction. Fixed ring gear 634 remains stationary with respect to drive shaft housing 28 at all times.

When power is applied to electric motor 602, worm gear 610 rotates and worm wheel 612 moves with respect to drive shaft housing 28. The movement of worm wheel 612 causes a corresponding movement in the connected actuating ring gear 614 and the three meshing rear planet gears 616. Because the three rear planet gears 616 and the three front planet gears 628 are linked by the same sun gear 618, the movement of the three rear planet gears 616 causes the rotational movement of front pinion carrier 632 with respect to rear pinion carrier 624 attached to drive shaft 50. This rotational movement causes bevel gear 642 to rotate relative to drive shaft 50, thus changing the incline angle of swashplate 72.

This particular embodiment is highly efficient due to the use of the planetary gears and because the highest speed members (planet gears 616 and 628) are the smallest members. The three planet design is naturally concentric and fully balanced. This design is lightweight and quiet. In this design, pinion shafts 622 and 630 have favorable tangential force distributions because there is no moment about their associated planet gears. All of the pinion shafts are supported at both ends by the carriers. This provides support equally to both ends of the planet gears, thus minimizing deflections. Front pinion carrier 632 and rear pinion carrier 624 have surfaces that nest together and provide built-in ratio stops at the full stroke and zero stroke extremes. The particular configuration of the interconnected planet gear sets utilized in this alternative embodiment (i.e. the use of the common sun gear, the stationary motor driven rear ring gear, the fixed front ring gear, the fixed rear pinion carrier and the adjustable front pinion carrier) requires low control torque while maintaining high transmittal torque.

The design counteracts shaft bending and counteracts swashplate dynamic forces by deliberately creating opposing unbalanced forces within the actuator. As can be seen in FIG. 30, the bearings which support drive shaft 50 are located outside of both swashplate 72 and swashplate actuator 600. While the swashplate assembly is very efficient at converting the vertical motion of the pistons into rotational motion in drive shaft 50, there are circumstances when significant non-torsional forces will also be transmitted through swashplate 72 to drive shaft 50. When drive shaft 50 experiences a significant deflection, the mass of swashplate actuator 600 will also be radially displaced along with the section of drive shaft 50 between the support bearings. The tooth meshes between planet gears 616 and 628, sun gear 618 and ring gears 614 and 634 have been designed to allow for adequate backlash to accommodate the radial displacement associated with this type of shaft bending. Because actuating ring gear 614 is stationary with respect to drive shaft housing 28 (unless the swashplate incline angle is being changed), the inertia of this component tends to reduce the deflection of drive shaft 50 by opposing the radial excursion of meshing planet gears 616. The rotational mass subject to displacement is reduced in this embodiment because electric motor 602 is fixed to drive shaft housing 28, rather than rotating with drive shaft 50. Because centrifugal forces tend to increase shaft deflection when the rotational mass subject to displacement is larger, this alternative embodiment offers improved performance characteristics in shaft bending situations.

Due to the inherent design of the swashplate drive in Stirling engine 10, drive shaft 50 deflects due to a severe bending moment. This does not necessarily have any adverse effect on swashplate 68 or drive shaft 50. A deflection of drive shaft 50 could impose additional loading on the gear train of swashplate actuator 600 if the ring gears (actuating ring gear 614 and fixed ring gear 634) were rigidly mounted to drive shaft housing 28. To avoid this possible additional loading, which would decrease the life of the bearings and gears, swashplate actuator 600 has been designed as a cartridge assembly which is solely supported by drive shaft 50. This is accomplished through the use of a set of roller bearings (front cartridge needle roller bearing 664 and rear cartridge needle roller bearing 678) and a pair of sheet metal covers (front actuator housing 636 and rear actuator housing 641). The tab sections of rear actuator housing 641 and front actuator housing 636 have also been designed to allow radial movement of the tab sections within the recess sections of drive shaft housing 28. This design allows the cartridge swashplate actuator subassembly 601 to move radially with any drive shaft 50 deflection.

In this design, the location of worm wheel 612 axially along drive shaft 50 must be stringently maintained. In order to maintain the axial position, but allow radial freedom, a set of sheet metal springs 680 are utilized. Sheet metal springs 672 hold cartridge swashplate actuator subassembly 601 against a shoulder in drive shaft housing 28, but allow the radial movement described above.

The electric motor 602 assembly includes a motor brake assembly 604 to reduce the required control power and is packaged in a cartridge assembly to aid in the ultimate assembly of the completed Stirling engine. This design provides optimized work support and a fine adjustment of bevel angular travel that is also repeatable.

An actuator controller is used to control the operation of electric motor 602 which drives the other components of electric swashplate actuator 600. This actuator controller has two separate control routines. In the start up routine, motor brake assembly 604 is released and the actuator controller moves swashplate 68 to the "full angle" mechanical stop position by rotating electric motor 602 counter clock wise at a very low speed (less than 100 revolutions per minute) while monitoring the motor speed and current to determine when the mechanical hard stop is contacted. When the hard stop is reached, speed goes to zero and current increases, indicating an "end of travel" condition. Electric motor 602 is then stopped, motor brake assembly 604 is engaged and the position counters in the actuator controller are reset to establish the "full angle" reference point. An identical shut down routine may also be performed immediately prior to engine shut down in order to "pre-position" the swashplate actuator to the home position.

In the operating routine, the actuator controller waits until the engine controller transmits a desired swashplate angle to the actuator controller. The actuator controller then determines the number of revolutions and rotational direction electric motor 602 must run to place swashplate 68 at the proper swashplate angle. Motor brake assembly 604 is then released, electric motor 602 is instructed to begin rotating in the proper direction, and a position error counter within the actuator controller is initialized. The magnitude of the position error counter determines the level of power delivered to the motor and is updated for every tach cycle (several times per revolution). Once electric motor 602 begins to rotate, a digital tach pulse signal is generated and the actuator controller either subtracts or adds this tach count from the position error counter until the error is zero. When a zero error status has been achieved, the actuator controller instructs electric motor 602 to stop and motor brake assembly 604 is engaged, which locks the motor shaft position. The system then remains in standby mode waiting for the next position command to be received from the engine controller.

Cross Head Assembly

Details of cross head assembly 220 are best shown with references to FIGS. 2, 3 and 6 through 9. Cross head body 222 forms a caliper with a pair of legs 224 and 226 connected by center bridge 228. Each of legs 224 and 226 define a pair of guide bores 230. Preferably, journal bearings are installed within guide bores 230 such as porous bronze graphite coated bushings 232. Bushings 232 enable cross head body 222 to move smoothly along guide rods 26. Cross head leg 224 also forms stepped cross head slider cup bore 234 a portion of which is threaded. Leg 226 forms slider cup bore 236 which also has a conical section 238. Within bores 234 and 236 are positioned slider cups 240 and 242, respectively. Slider cups 240 and 242 form semi-spherical surfaces 244 and 246. Slider elements 248 and 250 also define spherical outside surfaces 252 and 254, respectively, which are nested into slider cup surfaces 244 and 246, respectively. Opposing flat surfaces 256 and 258 are formed by the slider elements and engage swashplate disc 72. As will be explained in more detail below, a hydro-dynamic oil film is developed between spherical flat surfaces 256 and 258 as they bear against disc 72 to reduce friction at that interface. In a similar manner, a hydro-dynamic oil film is developed between slider cup spherical surfaces 244 and 246, and slider spherical outside surfaces 252 and 254.

Figure 8:
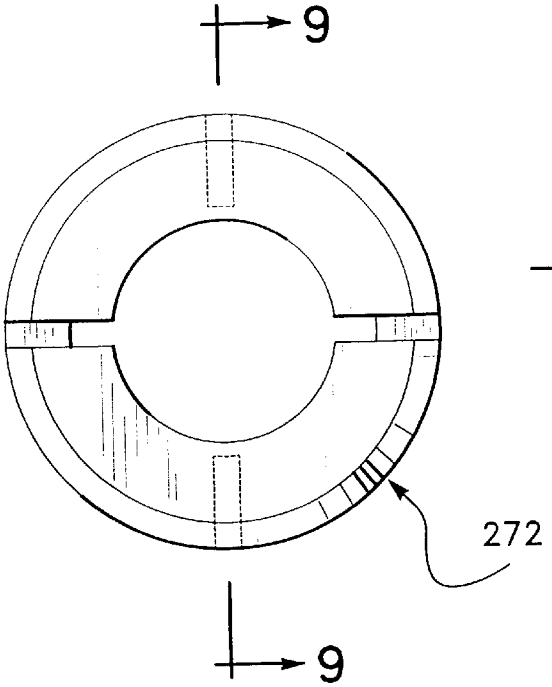
FIG. 8 is a top view of the cross head adjuster sleeve.
Figure 9:
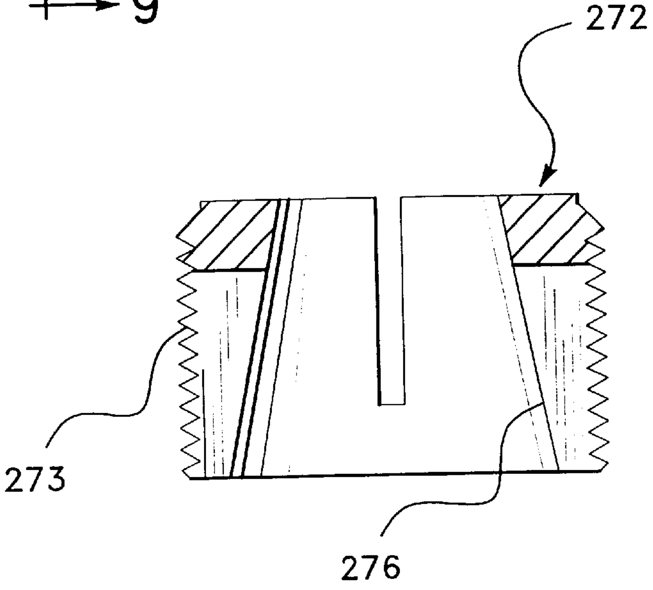
FIG. 9 is a cross-sectional view taken along line 9—9 of FIG. 8.

Piston rods 260 extend between associated pistons and slider cup 242. Piston rod 260 has a threaded end 262 which meshes with slider cup threaded bore 264. The end of piston rod 260 adjacent threaded end 262 forms a conical outside surface 266 which is tightly received by cross head bore conical section 238. Thus, the relative position between slider cup 242 and cross head leg 224 is fixed. However, slider cup 240 is provided with means for adjusting its axial position within cross head body bore 234 such that precise adjustment of the clearances of the hydro-dynamic films is achievable. Slider cup 240 includes an extended threaded stud 270. In the annular space surrounded threaded stud 270 are adjuster sleeve 272 and cone 274. As best shown in FIGS. 8 and 9, sleeves 272 define an inside conical surface 276 and an outside threaded surface 273. Two perpendicular slits are formed diametrically across sleeve 272, one from the upper surface and one from the bottom surface and render the sleeve compliant in response to hoop stresses. Adjustment of the clearances for the hydro-dynamic films is provided by changing the axial position of slider cup 240 in bore 234 which is done by rotating sleeve 272, causing it to advance into slider cup bore 234, due to the threaded engagement of the sleeve in the bore. Once the gaps are adjusted properly, nut 278 is threaded onto stud 270 which forces cone 274 into engagement with sleeve conical surface 276, causing the sleeve to radially expand. This action forces the sleeve into tight engagement with cross head bore 234, keeping it from rotating, thus fixing the position of cup 240.

Rod Seals

As shown in FIG. 1, piston rod seal assembly 290 includes housing 292 mounted within rod seal bore 60. Rod seal assembly 290 further includes spring seal actuator 294 which urges an actuating collar 296 against sealing bushing 298. Seal actuator spring 294 is maintained within housing 292 through installation of an internal C-clip 300. Due to the conical surfaces formed on collar 296 and bushing 298, seal actuator spring 294 is able to cause the bushing to exert a radially inward squeezing force against piston rod 260, thus providing a fluid seal. Preferably, collar 296 is made of an elastomeric material such as a graphite filled Teflon™ material.

Figure 1A:
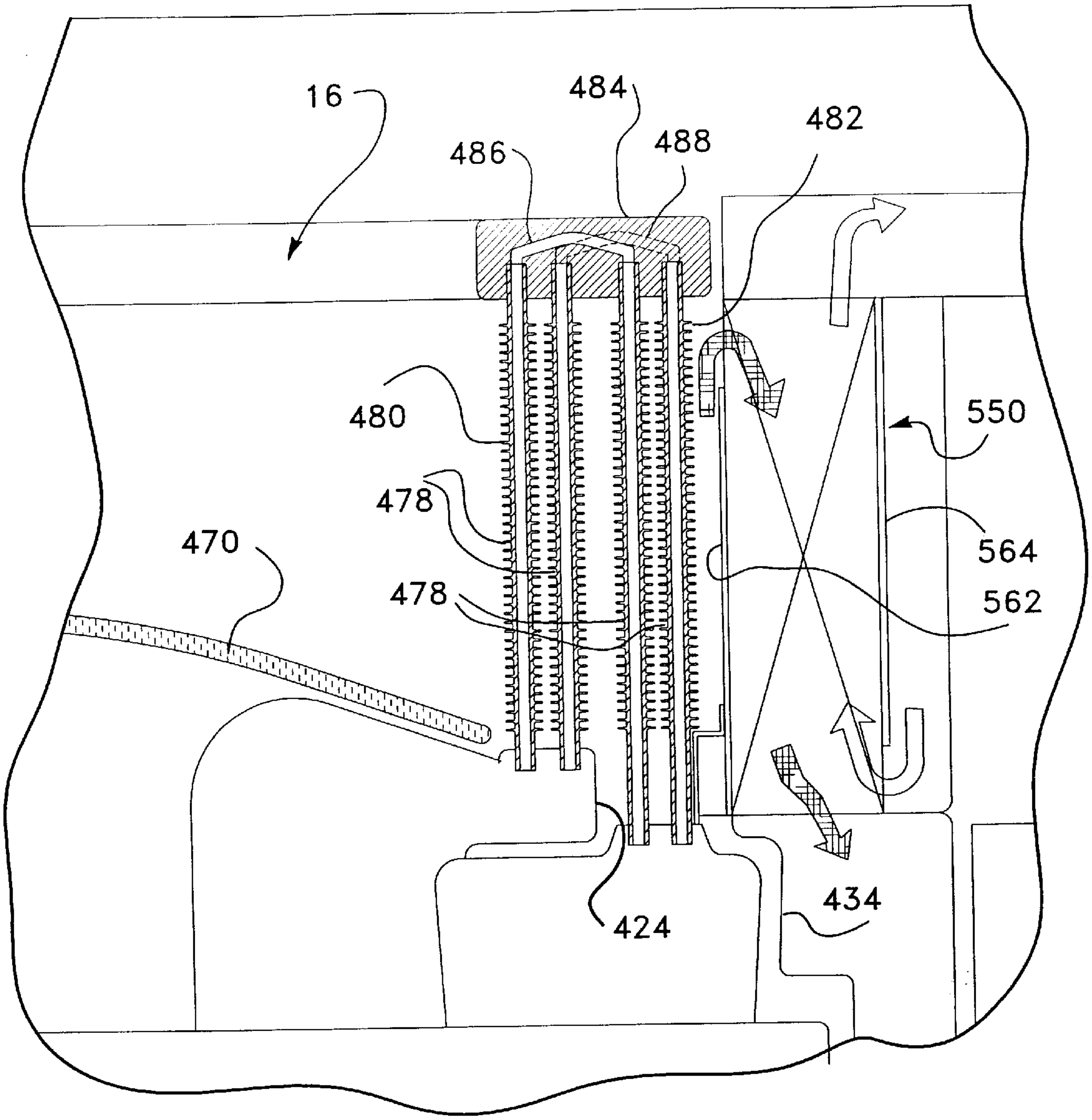
FIG. 1A is a longitudinal cross-sectional view of the heater assembly of the engine according to this invention.
Figures 1B, 1C:
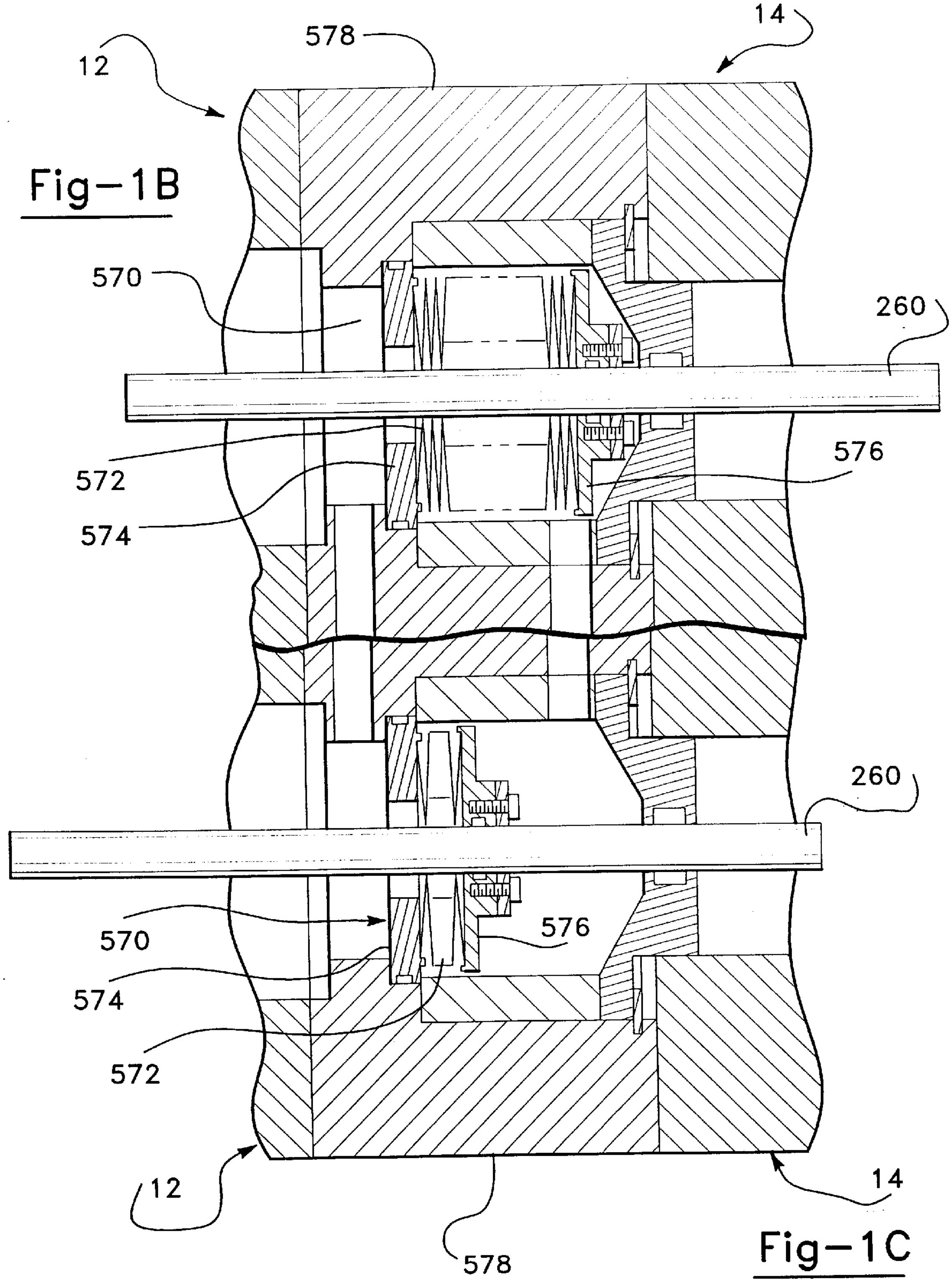
FIG. 1B is a partial cross-sectional view of a bellows rod seal incorporated into a modified form of this invention showing the bellows in an extended condition.
FIG. 1C is a view similar to FIG. 1B but showing the bellows compressed.
Figure 2:
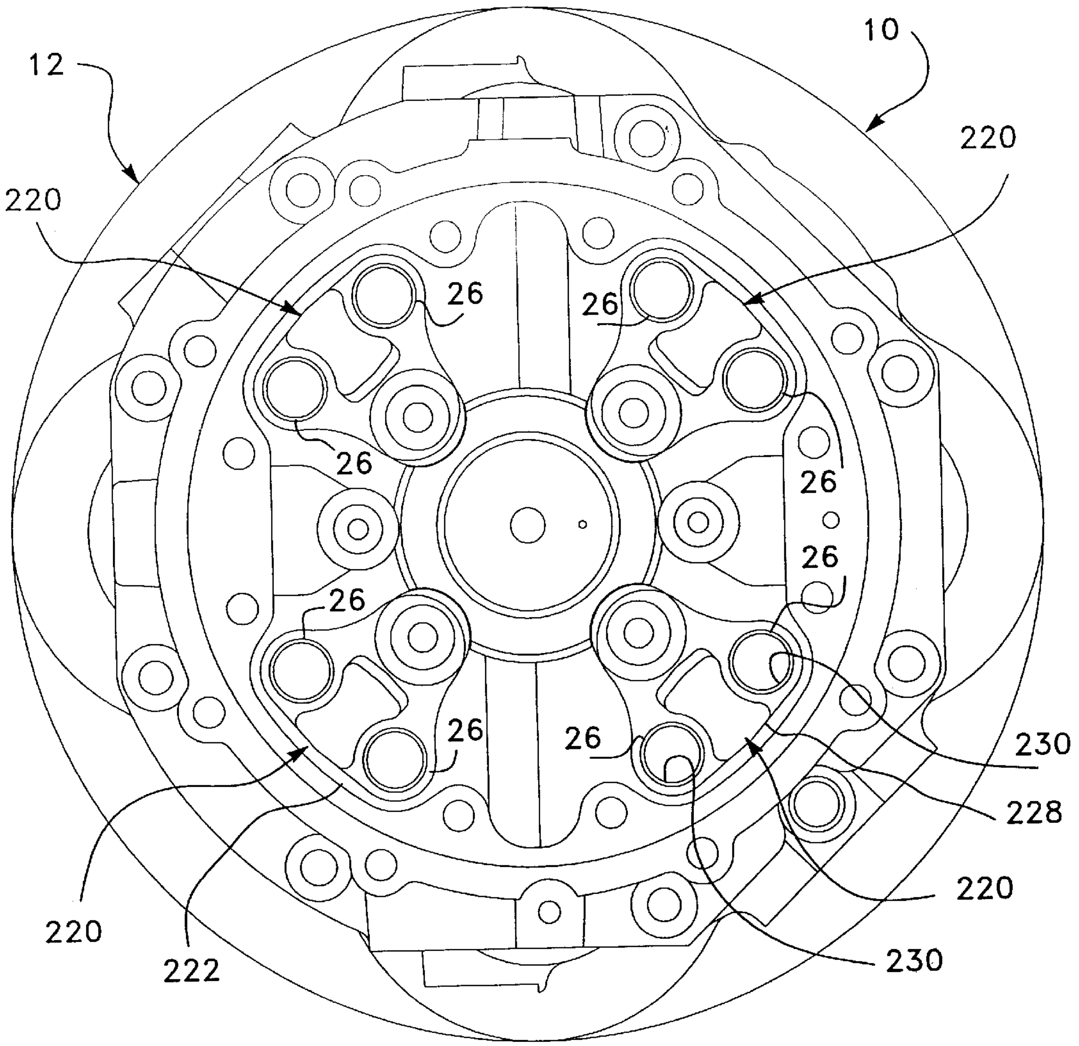
FIG. 2 is an end view of the drive case assembly taken from the output shaft end of the drive case, particularly showing the cross head components.

An alternate embodiment of a rod seal assembly is shown in FIGS. 1B and 1C. Bellows seal assembly 570 provides a hermetic rod seal. Bellows element 572 has its stationary end mounted to base 574, whereas the opposite end is mounted to ring 576. Bellows seal assembly 570 is carried by block 578 clamped between cylinder block assembly 14 and drive case assembly 12. FIG. 1B shows the bellows seal element in an extended position whereas FIG. 1C shows the element compressed. The design of engine 10 readily allows the sliding contact rod seal 290 to be replaced by bellows seal assembly 570 without substantial reworking of the engine design.

Lubrication System

Oil lubrication of machine 10 takes place exclusively within drive case assembly 12. As mentioned previously sump port 62 provides a collection point for lubrication oil within drive case housing 18. Through a sump pick-up (not shown), oil from sump port 62 enters oil pump 56 where it is forced at an outlet port through a number of lubrication pathways. Some of this oil sprays from nozzle 58 onto piston rods 260 and cross head guide rods 26. Another path for oil is through a center passage 310 within drive shaft 50. Through a series of radial passageways 312 in drive shaft 50, oil is distributed to the various bearings which support the drive shaft. Oil is also ported to swashplate 68 surfaces. The oil then splashed onto the sliding elements of the cross head assembly including slider cups 240 and 242, and slider elements 248 and 250. The exposed surfaces of these parts during their operation are coated with oil and thus generate a hydro-dynamic oil film.

Cylinder Block

Figure 10:
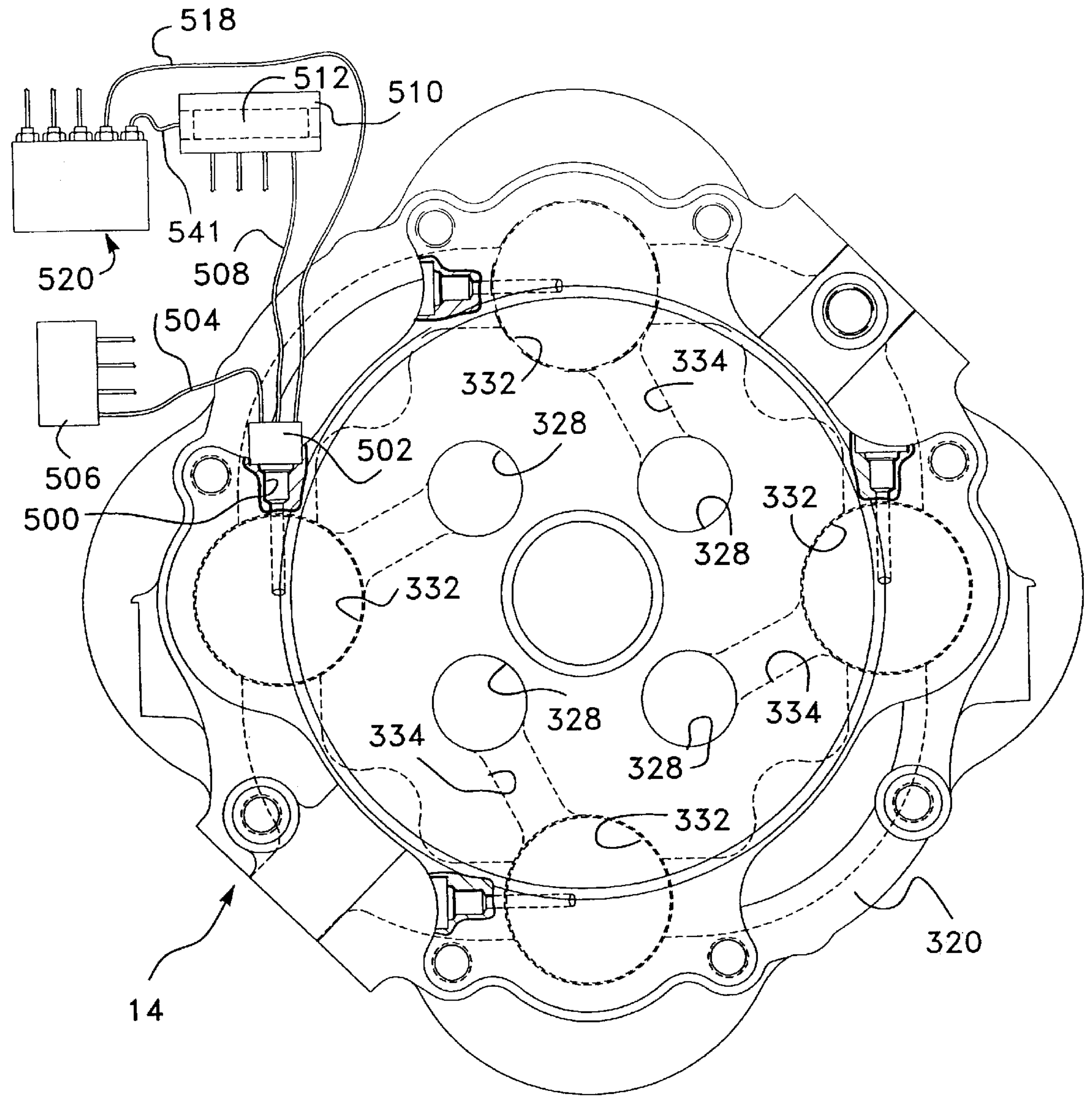
FIG. 10 is an end view of the cylinder block component taken from the end of the drive case assembly.

Cylinder block assembly 14, best shown in FIGS. 1 and 10, includes a cylinder block casting 320 having a pair of opposed parallel flat mating surfaces 322 and 324. Mating surface 322 enables cylinder block casting 320 to be mounted to drive case housing mating surface 22. Bolts 326 hold these two parts together. Stirling engine 10 according to the present invention is a four cylinder engine.

Accordingly, cylinder block casting 320 defines four cylinder bores 328 which are mutually parallel. As shown in FIG. 1, cylinder bores 328 define a larger diameter segment through which piston assembly 330 reciprocates, as well as a reduced diameter clearance bore section for rod seal assembly 290. Four cooler bores 332 are also formed in cylinder block casting 320 and are mutually parallel as well as parallel to cylinder bores 328. Cylinder bores 328 are arranged in a square cluster near the longitudinal center of cylinder block casting 320. Cooler bores 332 are also arranged in a square cluster but lie on a circle outside that of cylinder bores 328, and are aligned with the cylinder bores such that radials through the center of cooler bores 332 pass between adjacent cylinder bores. In that Stirling engine 10 is a double acting type, cylinder block casting 320 including working gas passageways 334 which connect the bottom end of cooler bore 332 to the bottom end of an adjacent cylinder bore 328 as shown in FIG. 10. Cylinder block casting 320 further forms coolant passageways 336 which provide for a flow of liquid coolant through coolant bores 332 in a diametric transverse direction.

Piston Assembly

Figure 11:
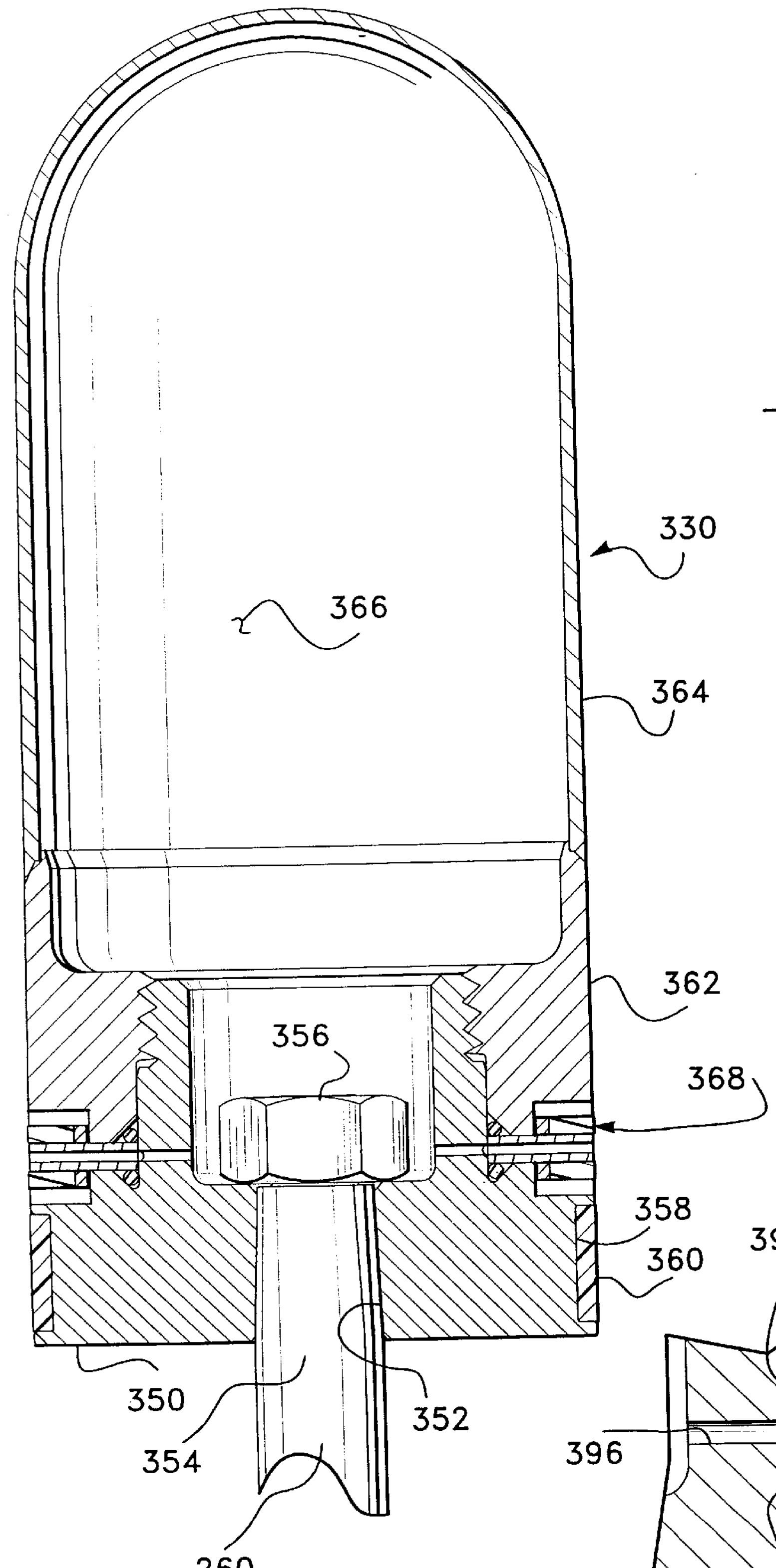
FIG. 11 is a longitudinal cross-sectional view through the piston assembly.
Figure 12:
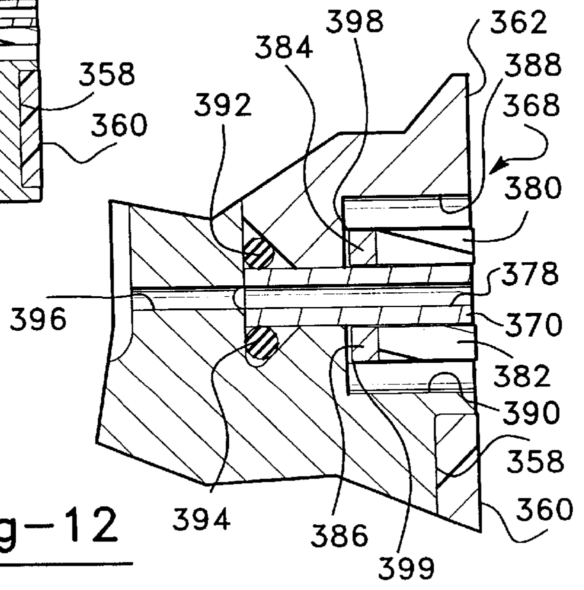
FIG. 12 is an enlarged partial cross-sectional view particularly showing the piston ring assembly of this invention.

Piston assembly 330 is best shown with reference to FIGS. 11 and 12. Piston base 350 forms a conical bore 352 which receives a conical end 354 of piston rod 260. Nut 356 combined with friction at the conical surfaces maintains the piston rod fixed to piston base 350. An outer perimeter groove 358 of the piston base receives bearing ring 360 which serves to provide a low friction surface engagement with the inside of cylinder bore 328. Bearing ring 360 is preferably made of an low friction elastomeric material such as “Rulon™” material. Dome base 362 is fastened onto piston base 350 through threaded engagement. Dome 364 is welded or otherwise attached to dome base 362. Dome 364 and dome base 362 define a hollow interior cavity 366 which is provided to thermally isolate opposing ends of piston assembly 330.

Located between piston base 350 and dome base 362 are a number of elements which comprise piston ring assembly 368 which provides a gas seal around the perimeter of piston assembly 330 as it reciprocates in its bore. Sealing washer 370 is clamped between piston base 350 and dome base 362 and is a flat with opposing parallel lapped surfaces. A number of radial passageways 378 are drilled through washer 370. On opposing sides of sealing washer 370 are provided sealing rings 380 and 382 preferably made of “Rulon™” type elastomeric low friction material. Sealing rings 380 and 382 contact cylinder bore 328 to provide gas sealing. Acting at the inside diameter of sealing rings 380 and 382 are spring rings 384 and 386 which are split to provide radial compliance. Spring rings 384 and 386 are provided to outwardly bias sealing rings 380 and 382, urging them into engagement with the cylinder bore.

At a number of circumferential locations, passageways 388 are drilled radially into dome base 362. In a similar manner, passageways 390 are formed within piston base 350. A pair of O-rings 392 and 394 are clamped against opposing face surfaces of sealing washer 370. At axial location aligned with sealing washer 370, piston base 350 defines one or more radial passageways 396 communicating with piston dome interior cavity 366 which functions as a gas accumulator.

As piston assembly 330 reciprocates within its bore the two sealing rings 380 and 382 provide a gas seal preventing cycle fluid from leaking across the piston assembly. Sealing rings 380 and 382 are pressure actuated such that only one of the two rings is providing a primary seal at any time. Specifically, sealing ring 380 provides a gas seal when the piston is moving downwardly (i.e. toward swash plate 68) whereas sealing ring 382 is pressure actuated when the piston is moved in an upward direction. Since Stirling engine 10 is of the double acting variety, piston assembly 330 is urged to move in both its reciprocating directions under the influence of a positive fluid pressure differential across the piston assembly. Thus, just after piston assembly 30 reaches its top dead center position, a positive pressure is urging the piston downwardly. This positive pressure acts on sealing ring 380 urging it into sealing contact with the upper surface of sealing washer 370. The lower sealing ring 382 however, is not fluid pressure actuated since it is urged away from sealing contact with sealing washer 370 since passageway 390 provides for equal pressure acting on the upper and lower sides of the ring. In the upward stroke of piston assembly 330 a positive pressure is urging the piston to move upwardly and thus sealing ring 382 seals and sealing ring 380 is not fluid pressure actuated as described previously. As this reciprocation occurs, piston cavity 366 is maintained at the minimum cycle pressure. This assures that the radial clearance space between sealing rings 380 and 382 is at a low pressure, thus providing a pressure differential for pressure actuating the seal rings into engagement with the inside diameter of the piston bores, thus providing a fluid seal.

Cooler Assembly

Figure 13:
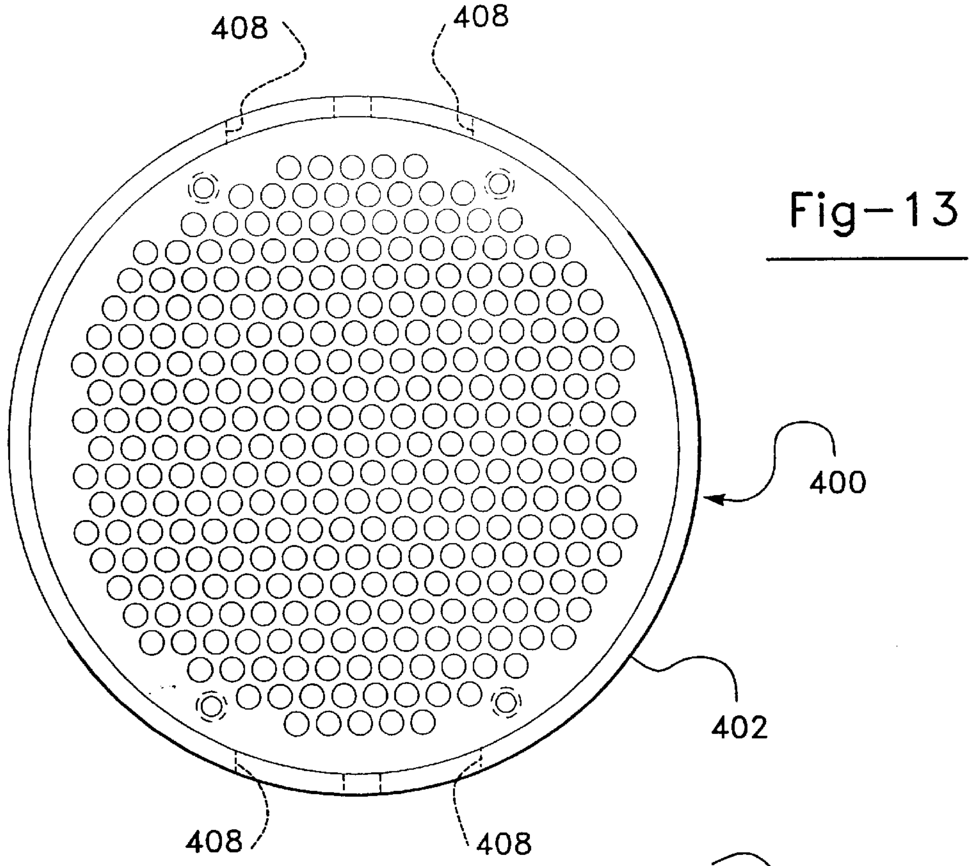
FIG. 13 is a top view of the cooler assembly.
Figure 14:
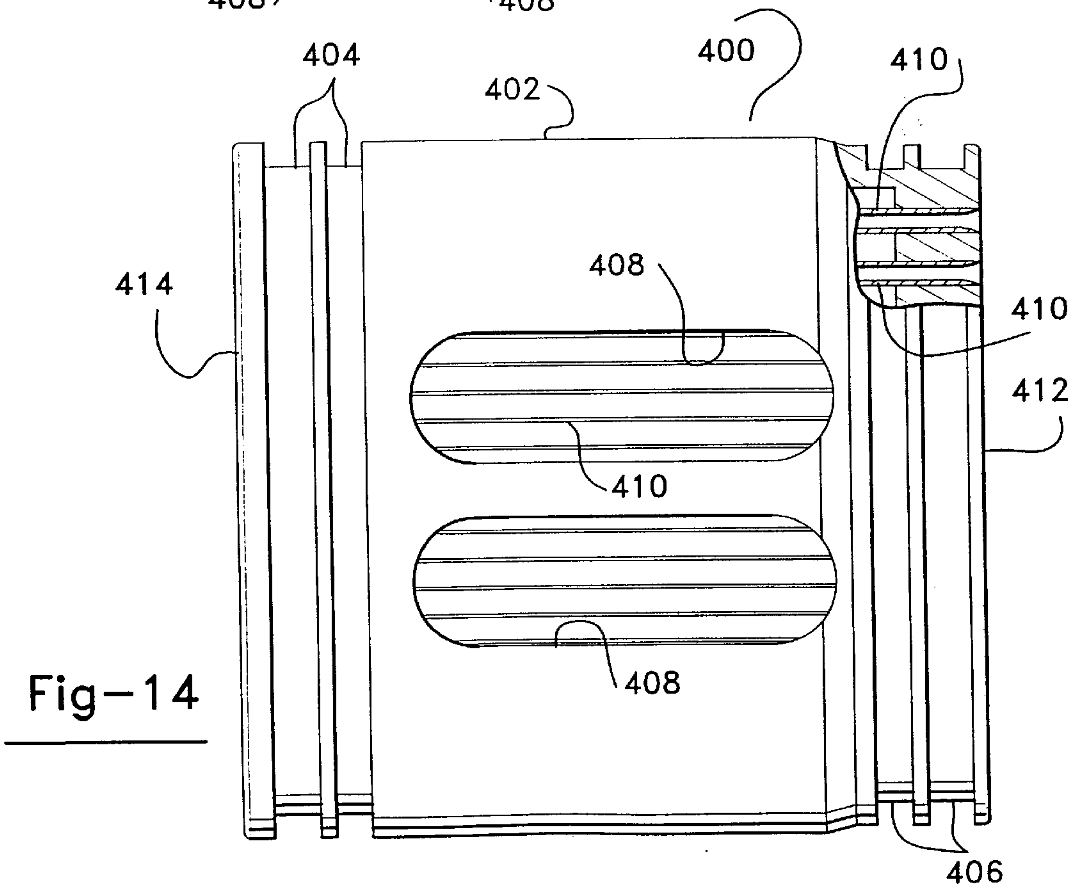
FIG. 14 is a side view partially in section of the cooler assembly.

Cooler assembly 400 is best shown with reference to FIGS. 13 and 14 and is disposed within cylinder block cooler bores 332. Cooler assembly 400 compromises a “shell and tube” type heat exchanger. As shown, housing 402 includes pairs of perimeter grooves at its opposite ends which receive sealing rings 405 for sealing the assembly within cooler bore 332. Housing 402 also forms pairs of coolant apertures 408 within housing 402. A number of tubes 410 are arranged to extend between housing ends 412 and 414. Tubes 410 can be made of various materials and could be welded or brazed in place within bores in housing ends 410 and 414. As a means of reducing flow loses of the Stirling cycle working gas, the ends of the inside diameters of tubes 410 are counter bored or flared to form enlarged openings. The Stirling cycle working gas is shuttled back and forth between the ends 412 and 414 of the cooler housing and passes through the inside of tubes 410. A coolant, preferably a liquid is pumped in a cross flow manner through block coolant passages 336 and housing apertures 408 to remove heat from the working gas.

Cylinder Extensions

Cylinder block assembly 14 further includes tubular cylinder tops or extensions 420 which form a continuation of the cylinder block bores 328. At their open ends, tubular cylinder extensions 420 form a skirt which allows them to be accurately aligned with cylinder bores 328 by piloting. O-ring seal 422 provides a fluid seal between cylinder block bores 328 and tubular cylinder extensions 420. Cylinder extensions 420 at their opposing end form a heater tube manifold 424 which will be described in more detail below.

Regenerator Housings

Cup shaped regenerator housings 430 are provided which are aligned co-axially with cooler bores 332. Regenerator housings 430 define an open end 432 and a closed top 434 having manifold 436 for communication with the heater assembly. Within regenerator housing 430 is disposed regenerator 444, which in accordance with known regenerator technology for Stirling engines, is comprised of a material having high gas flow permeably as well as high thermal conductivity and heat absorption characteristics. One type of regenerator uses wire gauze sheets which are stacked in a dense matrix.

Retainer Plate

Figure 15:
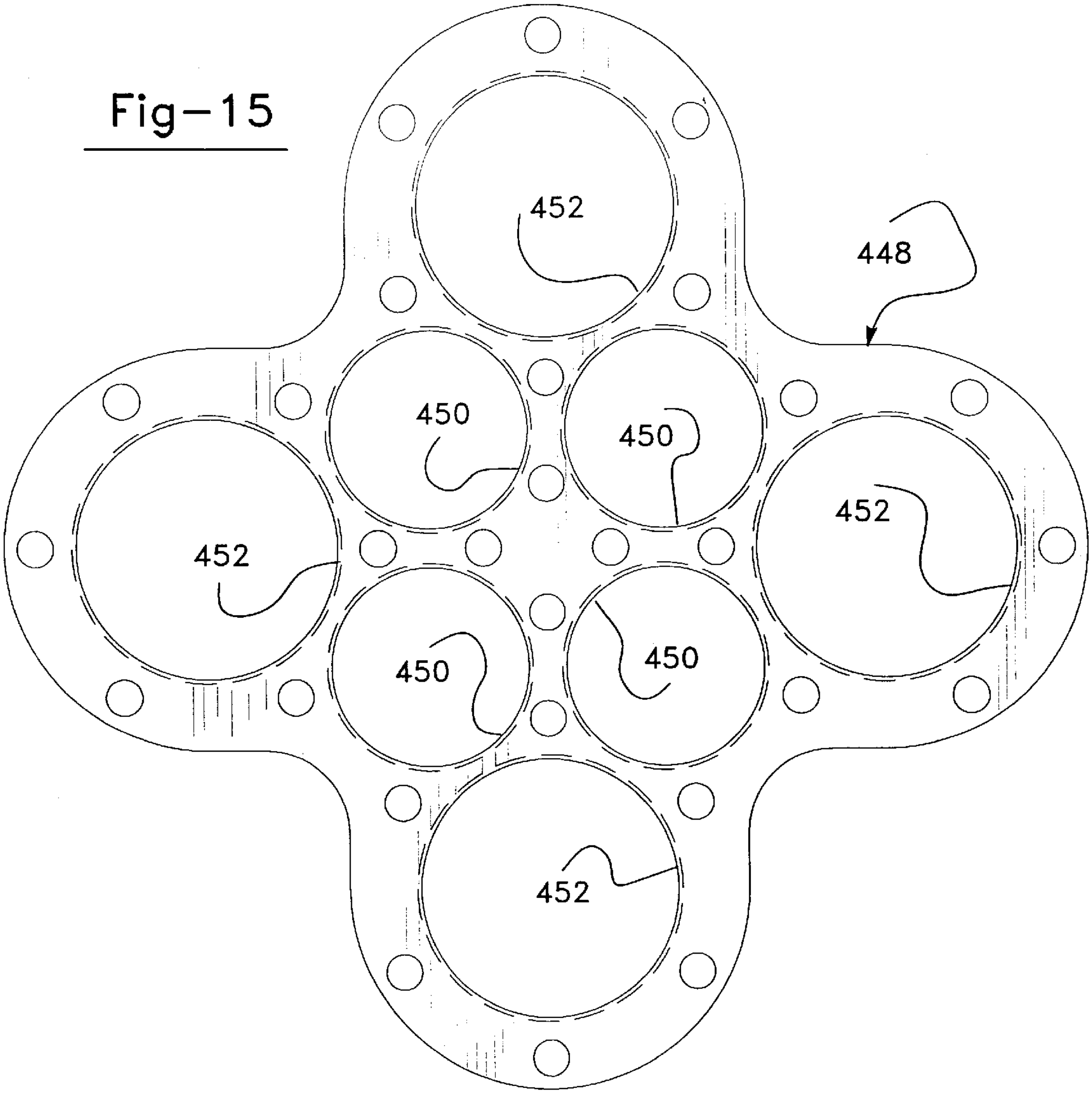
FIG. 15 is a plan view of retainer plate of this invention.
Figure 16:
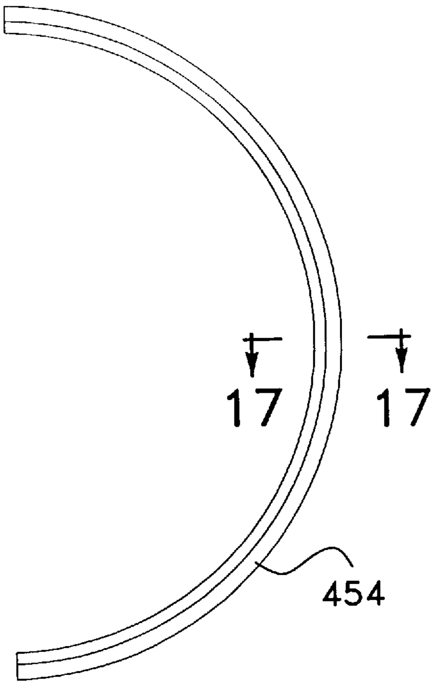
FIG. 16 is a plan view of a cylinder extension locking C-ring.
Figure 17:
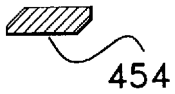
FIG. 17 is a cross sectional view taken along line 17—17 from FIG. 16.

Retainer plate 448 is best shown in FIG. 15 and provides a one-piece mounting structure for retaining tubular cylinder extensions 420 and regenerator housings 430 in position. Retainer plate 448 forms cylinder extension bores 450 and regenerator housing bores 452. Cylinder extension bores 450 have a diameter slightly larger than the largest diameter at the open end of tubular cylinder extension 420 and the bore is stepped as shown in FIG. 1. In a similar fashion, regenerator housing bores 452 are also enlarged with respect to the open end of regenerator housing 430 and are also stepped. Retainer plate 448 is designed so that the open ends of tubular cylinder extensions 420 and regenerator housings 430 can be inserted as an assembly through their associated plate bores. This is advantageous since the configuration of cylinder extension 420 and the heater assembly 16 attached to the cylinder extension and regenerator housing 430 would not permit top mounting. For assembly, retainer plate 448 is first positioned over cylinder extensions 420 and regenerator housings 430. Thereafter, semi-circular cylinder extension locking C-rings 454 shown in FIGS. 1, 16 and 17, and regenerator housings locking C-rings 456 are placed around the associated structure and allow retaining plate 448 to clamp these components against cylinder block mounting face 324, in a manner similar to that of an internal combustion engine valve stem retainer. Mounting bolts 458 fasten retainer plate 448 to cylinder block body 320. The use of a one-piece retaining plate provides rapid assembly and securely mounts the various components in an accurately aligned condition.

Cylinder extension 420 interact with cylinder block mating surface 324 to accurately pilot the center of the cylinder extensions with respect to cylinder block cylinder bores 328. However, the need for such accurate alignment does not exist for regenerator housings 430, and therefore, a face seal is provided allowing some degree of tolerance for misalignment between the regenerator housings and cooler bores 332. In this way, assembly is simplified by reducing the number of ports which must be simultaneously aligned.

Heater Assembly

Figure 18:
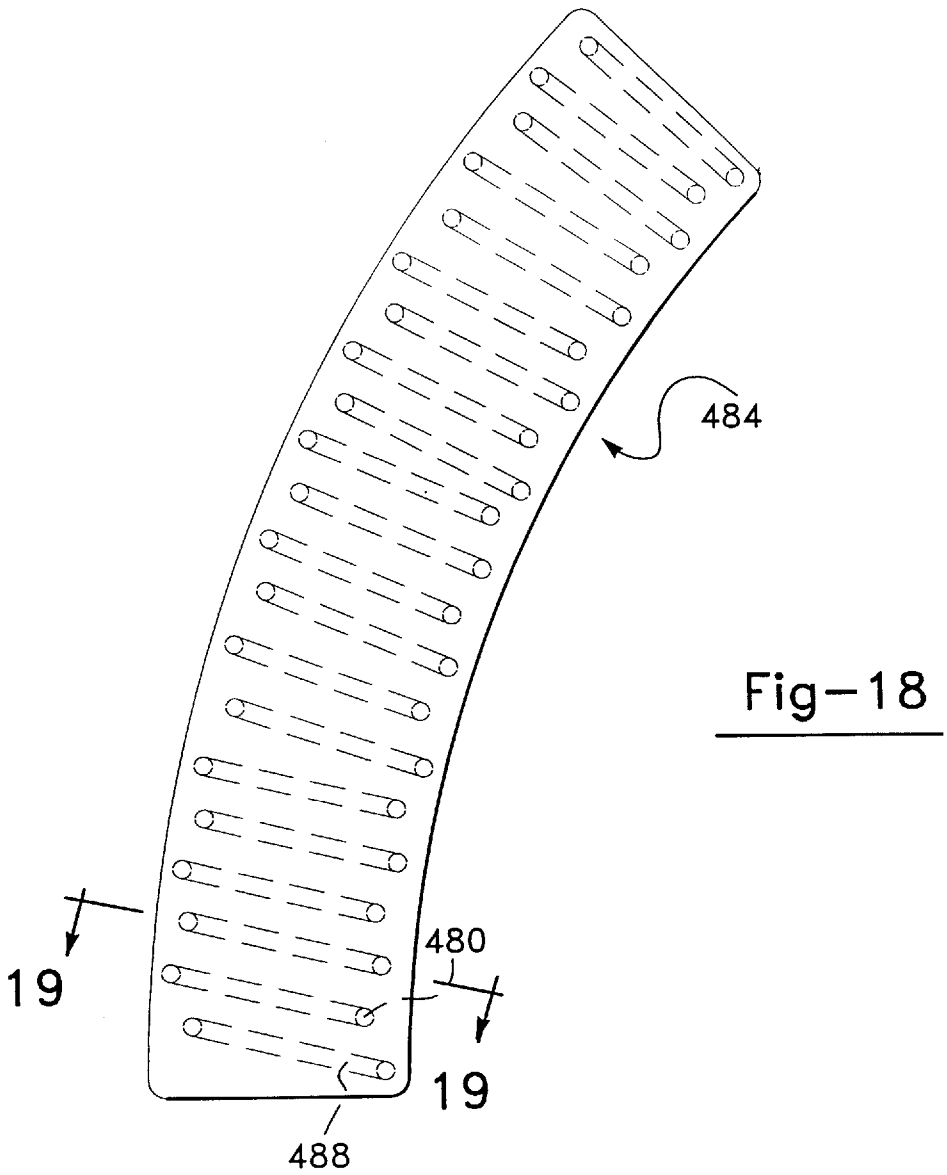
FIG. 18 is a plan view of a manifold segment of the heater head assembly of this invention.
Figure 19:
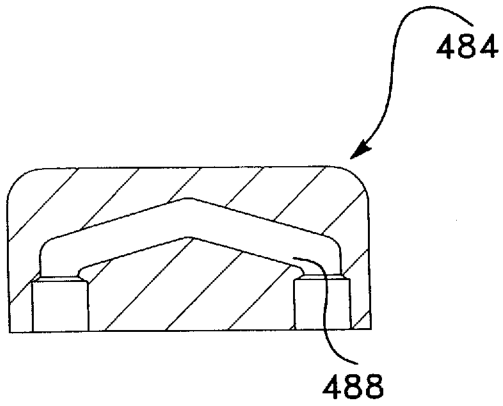
FIG. 19 is a cross-sectional view taken along line 19—19 of FIG. 18.

Heater assembly 16 provide a means of inputting thermal energy into the Stirling cycle working gas and is shown in FIG. 1A. A combustor (not shown) is used to burn a fossil fuel or other combustible material. Alternatively, heat can be input from another source such as concentrated solar energy, etc. In Stirling engine 10 according to this invention, combustion gases flow axially toward central heat dome 470 where it is deflected to flow in a radial direction. An array of heater tubes 478 is arranged to conduct heat from the hot gas as it flows radially out of the engine. Heat tubes 478 are arranged to form an inner band 480 and an outer band 482. The tubes of inner band 480 have one end which fits within cylinder extension manifold 424 and the opposite end fitting into heater tube manifold segment 484. As best shown in FIGS. 1A, 18 and 19, the tubes of inner bands 480 are arranged in a staggered relationship as are the tubes of outer band 482, thus enhancing heat transfer to the heater tubes. Manifold segment 484 has internally formed passageways such that the inner most tubes of inner band 480 are connected with the inner-most band of outer tubes 482 through passageways 486. In a similar manner the outer groups of inner and outer bands are connected via internal passageways 488. The tubes of the outer band 482 are connected with manifold segment 484 and the regenerator housing manifold 436.

Figure 20:
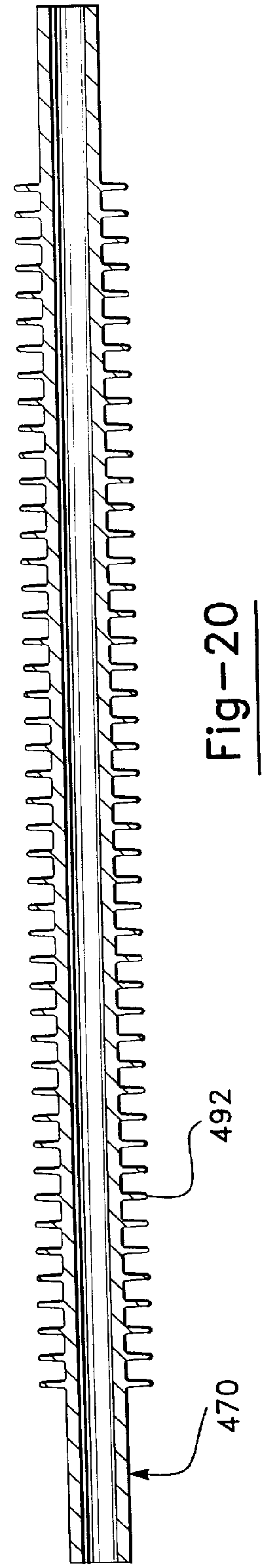
FIG. 20 is a longitudinal cross-sectional view of a heater tube from the heater head assembly.
Figure 21:
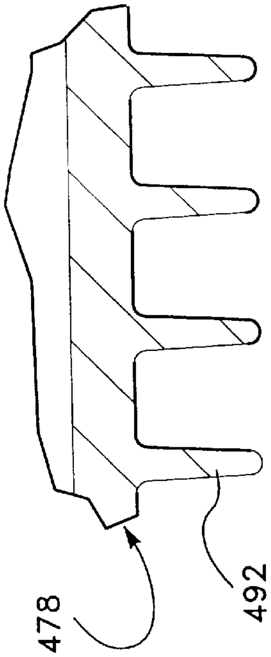
FIG. 21 is an enlarged partial cross-sectional view showing particularly the fin configuration of the heater tube.
Figure 23:
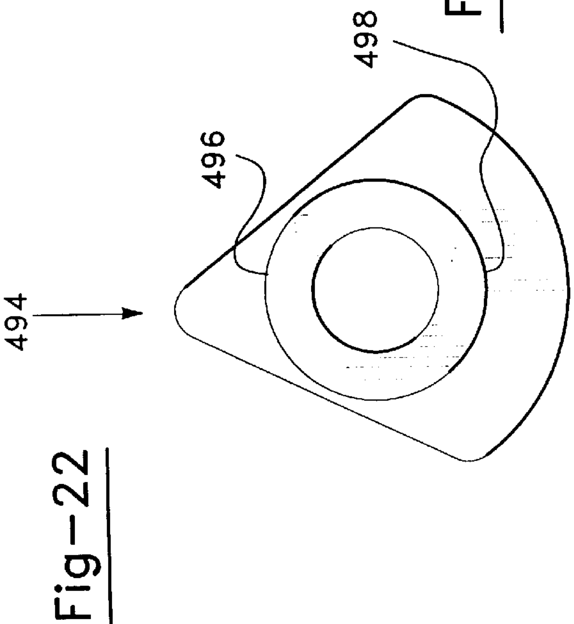
FIG. 23 is a plan view of an alternate configuration of a fin shape for a heater tube according to this invention.
Figure 22:
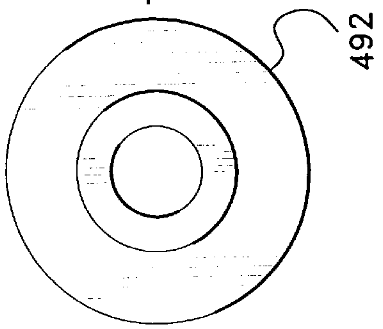
FIG. 22 is a plan view of one of the fins of the heater tube shown in FIG. 20.

Each of tubes 478 defining heater tube inner band 480 and outer band 482 are identical except the outer band tubes are longer. Tubes 478 are preferably made from a metal casting process which provides a number of benefits. The material which can be used for cast heater tubes can be selected to have higher temperature tolerance characteristics as compared with the deformable thin-walled tubes typically used. As shown in FIGS. 20 and 21, heater tubes 478 have projecting circular fins 492. The cross-section of the fins shown in FIG. 21 reveals that they can have a thickness which decreases along their length with rounded ends. Various other cross-sectional configurations for fins 492 can be provided to optimize heat transfer characteristics. In addition to optimizing the longitudinal cross-sectional shape of the fins, modifications of their perimeter shape can be provided. FIG. 22 shows a circular outside perimeter shape for fins 492. Using a casting process for forming heater tubes 478, other shapes to be provided. For example, FIG. 23 shows a generally dart shaped platform configuration. The configuration can be tailored to the gas flow dynamics which occur around the tubes. For example, it is known that for tubes arranged perpendicular to the gas flow direction, the upstream side surface 496 of the tubes tends to absorb more heat than the downstream or back side 498 of the tubes. For conventional tubes, this leads to significant thermal gradients which produce mechanical stresses on the heater tubes which can in turn lead to their failure over time. The platform provided in FIG. 23 may be advantageous to increase heat adsorption on the backside 498 to maintain more constant tube temperature for gas flowing in the direction of arrow 492 since more fin area is exposed on the downstream side where heat transfer is less efficient.

Pressure Balancing

As in conventional Stirling cycle engines employing multiple double acting cylinders, in the case of the four cylinder engine shown in connection with this invention, four distinct isolated volumes of working gas such as hydrogen or helium are present in the engine. One of the volumes is defined by the expansion space above piston dome 364 which in turn flows through heater tubes 478, regenerator 444, cooler assembly 400, and cylinder block passageway 334 to the lower end of an adjacent cylinder bore 328. In a similar manner, three additional discrete volumes of gas are defined. Each of the gas volumes undergo shuttling between a compression space defined at the lower end of piston cylinder bore 328 in cylinder block casting 320, and an expansion space defined within tubular cylinder extension 420. Thus, the gases are shuttled between these spaces as occurs in all Stirling engines. Gases passing through heater assembly 16 absorb heat and expand in the expansion space and are cooled by cooler assembly 400 before passing into the compression space.

In order to minimize imbalances in the operation of engine 10, the mean pressure of the four distinct gas volumes needs to be equalized. This is achieved through the use of working fluid ports 500 positioned at the lower-most end of cylinder block cooler bore 332, best shown in FIG.

10, each of which are exposed to the separate gas volumes. Fitting 502 is installed in a port and from it are three separate tube elements. A first small capillary tube 504 communicates with pressure transducer block 506 having individual pressure transducers for each of the gas volumes, enabling those pressures to be measured. Capillary tube 508 communicates with manifold block 510 having an internal cavity which connects each of the individual capillary tubes 508 together. The function of manifold block 510 is to "leak" together the volumes for equalization of any mean pressure imbalances which may occur between them. A low restriction passageway connecting these cycle volumes together would unload the engine and would constitute an efficiency loss. Therefore, tubes 508 have a restricted inside diameter and thus the flow rate through these tubes is restricted. However, over time, pressure imbalances are permitted to equalize through fluid communication between the volumes.

Unloader Valve

Figure 24:
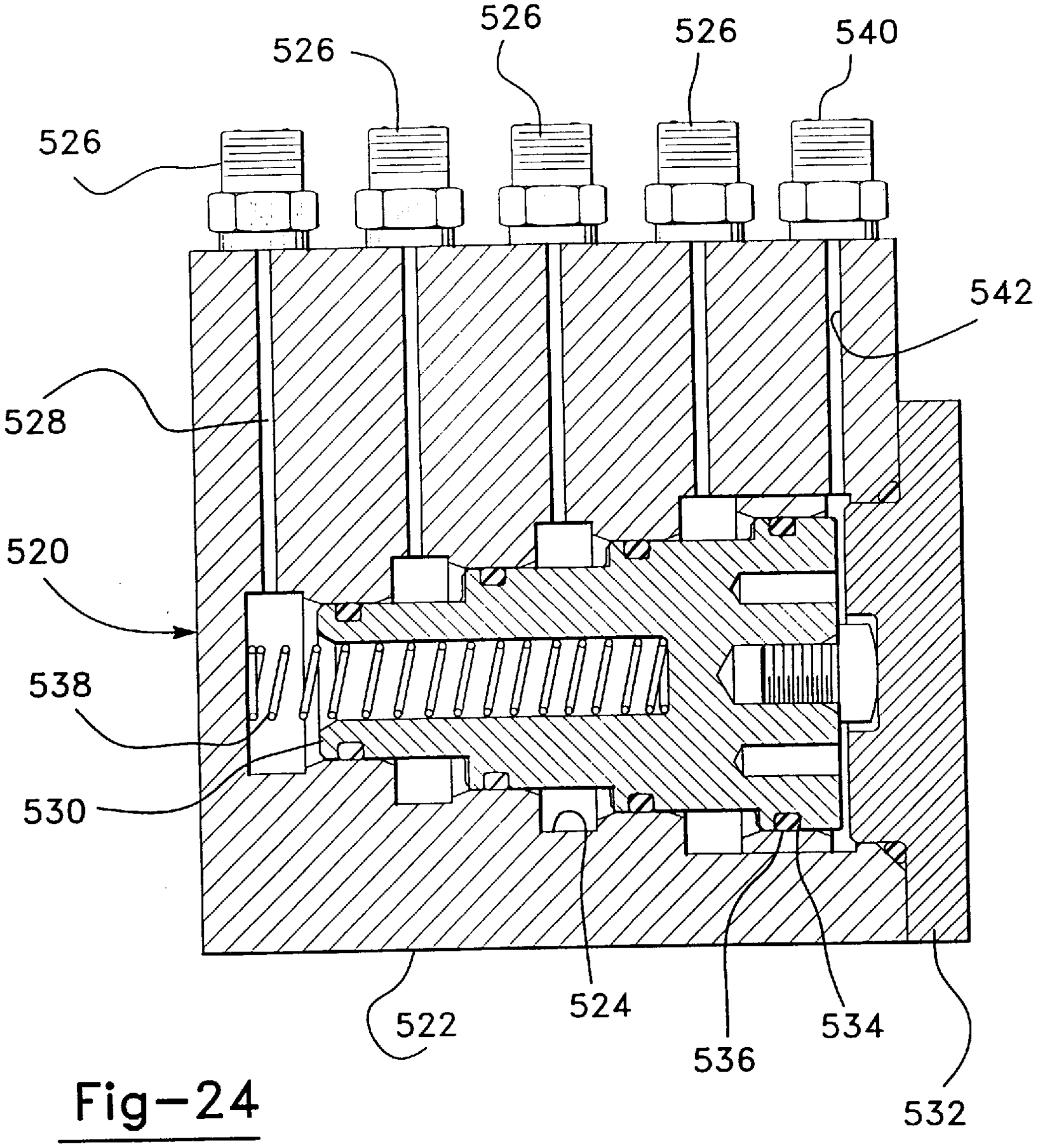
FIG. 24 is a cross-sectional view through the unloader valve.

In the event of a mechanical failure or other condition which leads to a leakage of working gas from the engine, a severe imbalance condition can result. For example, if only one or more of the enclosed gas volumes leaks to atmosphere, potentially destructive loads would be placed on the mechanical components of engine 10. In order to preclude this from occurring, conduits 518 communicate with unloader valve 520 as shown with reference to FIG. 24. As shown, unloader valve includes housing 522 within internal stepped bore 524. A series of pipe fittings 526 are provided which communicate with individual diameter sections of stepped bore 524 via passageways 528. Each of fittings 526 communicates with the separate gas volumes via conduits 518. Spool 530 is positioned within stepped bore 524 and is maintained in the housing by cap 532. A series of grooves 534 provided on the various diameter sections of spool 530 and retain O-rings 536. Spool 530 is urged in the right-hand direction as viewed in FIG. 24 by coil spring 538. An additional port is provided at fitting 540 which communicates with manifold block 510 via conduit 541 and is exposed to the engine mean pressure. This pressure signal passes through passageway 542 and acts on the full end area of spool 530. During normal engine operation, individual diameter sections of stepped bore 524 are exposed to a sinusoidal pressure wave from the respective gas volume. For any given shaft position, the pressure wave for each gas volume is out of phase with the other gas volumes. This results in varying pressures for each stepped bore for any given point in time. But the total force created by varying pressures over the respective areas is equal to the force created by the mean gas pressure over the full end area of the spool. This puts the system in equilibrium except for the force from the coil spring which biases the spool in the right-hand position. The spring force is only a small fraction of the gas load force. However, in the event of the mechanical failure of engine 10 causing a leakage of working fluid, one (or more) of the passageways 528 experiences a loss in pressure. In this event, the net force acting to retain spool 530 in position is reduced and the equilibrium condition is unbalanced to move the shuttle in the left-hand direction under the influence of the engine mean cycle pressure through passageway 542. When this occurs, the various O-rings 536 unseat from their associated sealing surfaces and thus all of the gas volumes are vented together inside housing 522, rendering the engine incapable of producing mechanical output power and thus protecting the engine from destructive imbalance forces.

Air Preheater

Figure 25:
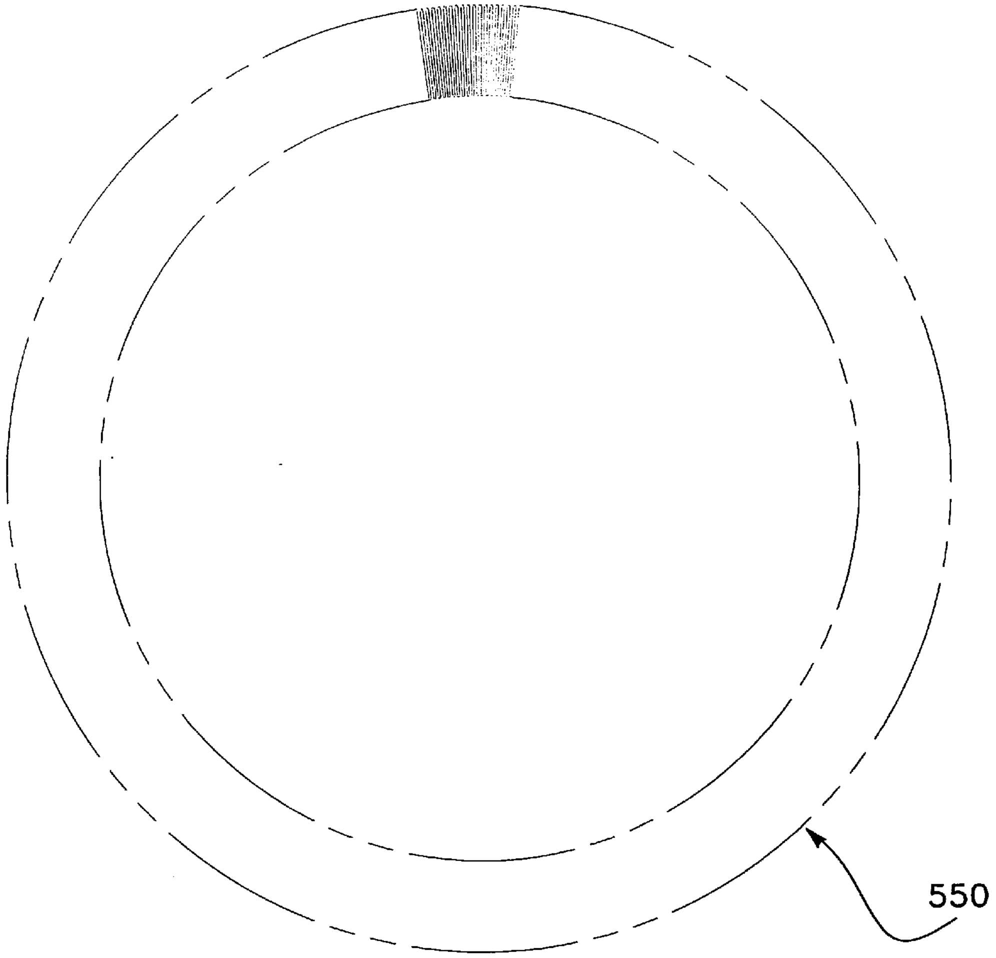
FIG. 25 is a top view of the air preheater.
Figure 26:
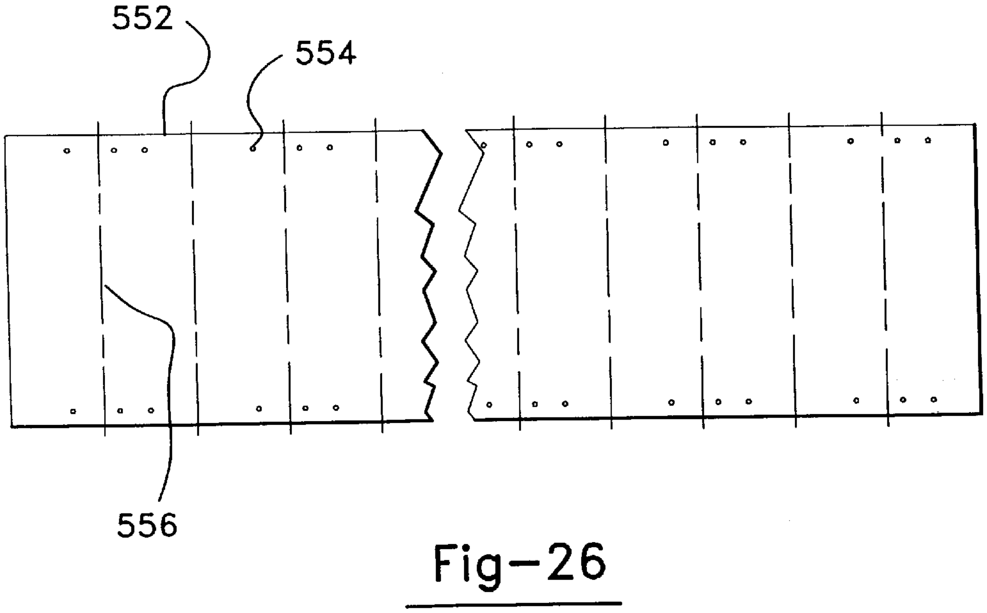
FIG. 26 shows a sheet of metal material from which the air preheater is formed.
Figure 27:
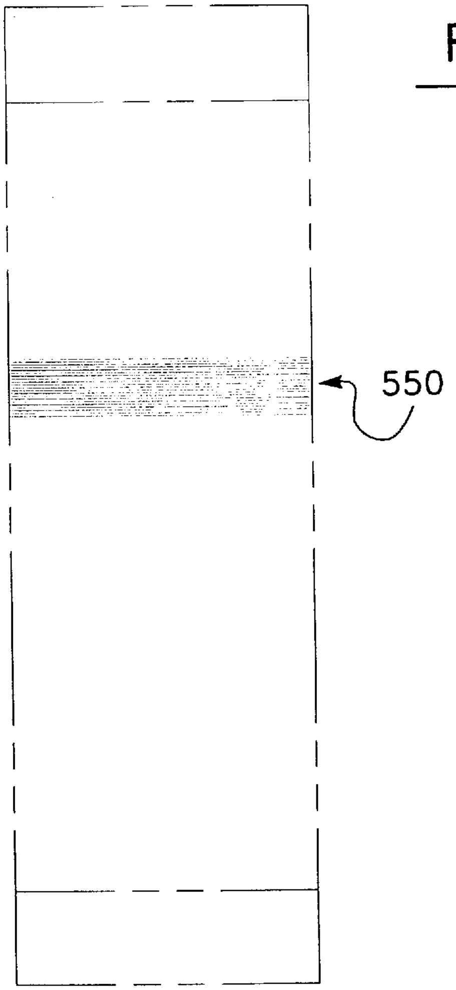
FIG. 27 is a side view of the air preheater shown in FIG. 25.
Figure 28:
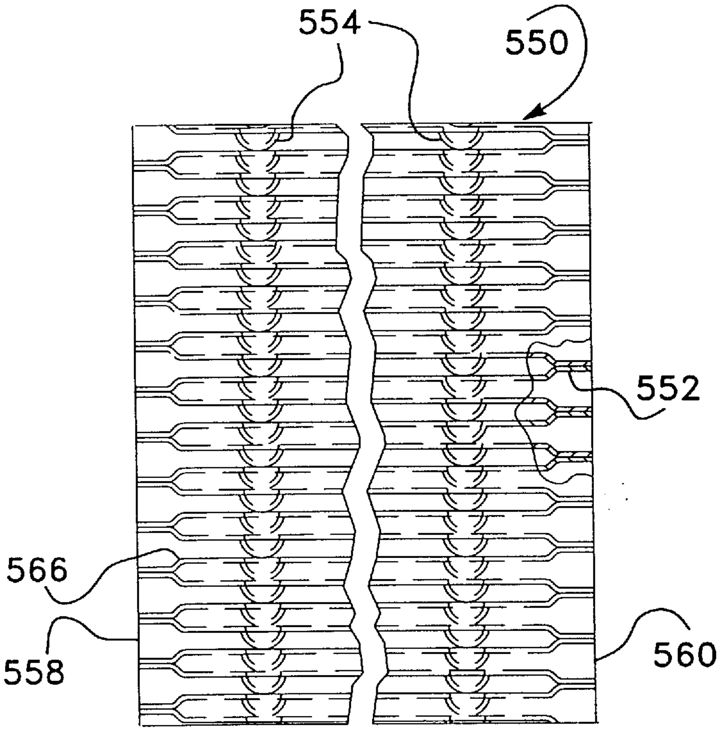
FIG. 28 is an enlarged side view particularly showing the alternately welded configuration of the adjacent leaves of the preheater.

Combustion gases which pass through heater tube inner and outer banks 480 and 482 still are at an elevated temperature and have useful heat energy which can be recovered to enhance the thermal efficiency of engine 10. This is achieved through the use of air preheater 550 which has an annular ring configuration and surrounds heater tube outer bank 482. Air preheater 550 is formed from sheet metal stock having a high temperature capability. The stock first begins with a flat sheet 552 which may have local deformations as shown in FIG. 26 such as dimples 554, and is bent in an accordion-like fashion about fold lines 556. After sheet 552 is corrugated, its ends are welded to define the annular preheater configuration shown in FIGS. 25, 27, and 28. FIG. 28 shows that these corrugations are pinched together and welded at the axial ends of the preheater. Upper end 558 is formed with adjacent layers pinched together and welded as shown. Bottom end 560 has layers which are pinched together but alternate with those pinched together at top end 558. This arrangement provides the gas flow direction shown in FIG. 1A in which combustion gas flow is shown by cross-hatched arrows and fresh combustion air by clear arrows. Combustion gases passing through heater assembly 16 are deflected by baffle 562. The hot gases then enter the inside diameter of air preheater 550. Since the upper end 558 of these wraps are sealed, the gas is forced to flow downwardly as shown by the arrows. After passing through air preheater 550 these gases are vented or are further treated downstream. Fresh combustion air enters at the radially outer side of air preheater 550 and is constrained to flow in an axial direction through baffle 564. Combustion inlet air travels upwardly in an axial direction as shown by the upward directed arrows and is thereafter conveyed to a fuel combustor (not shown). Heat is transferred through the thin sheet metal forming air heater 550.

As a means of further enhancing thermal efficiency of engine 10, the inside surface of air preheater 550 exposed to combustion gases can be coated with a catalyst material such as platinum or palladium, or other catalyst materials. This thin layer 566 encourages further combustion of hydrocarbons within the combustion gases which has the two-fold benefits of reducing emissions as well as increasing the combustion gas temperature thereby increasing combustor inlet air temperature and efficiency.

It is to be understood that the invention is not limited to the exact construction illustrated and described above, but that various changes and modifications may be made without departing from the spirit and scope of the invention as defined in the following claims.

We claim:

1. A swashplate actuator for a Stirling engine having a drive shaft, a drive case, and a swashplate, for adjusting the incline angle of said swashplate with respect to said drive shaft, said actuator mechanism comprising:

a motor mounted to said drive case, a first planetary gear set having: a first planetary gear set sun gear member, a first planetary gear set planet gear member, a first planetary gear set ring gear member, and a first planetary gear set planet gear carrier member, said first planetary gear set ring gear member coupled to and driven by said motor and said first planetary gear set planet gear carrier member fixed to said drive shaft, and a second planetary gear set having: a second planetary gear set sun gear member, a second planetary gear set planet gear member, a second planetary gear set ring gear member, and a second planetary gear set planet gear carrier member, said second planetary gear set sun gear member coupled to said first planetary gear set sun gear member, said second planetary gear set ring gear member coupled to said drive case, and said second planetary gear set planet gear carrier member operably coupled to said swashplate, whereby said first and second planetary gear sets are operatively interconnected and actuation of said motor adjusts the incline angle of said swashplate with respect to said drive shaft.

2. A swashplate actuator according to claim 1 wherein said first planetary gear set planet gear member and said second planetary gear set planet gear members are identically sized.

3. A swashplate actuator according to claim 1, further including a cartridge housing to be fixed to said drive case wherein said first planetary gear set and said second planetary gear set are substantially contained within said cartridge housing.

4. A swashplate actuator for a Stirling engine having a drive shaft, a drive case, and a swashplate, for adjusting the incline angle of said swashplate with respect to said drive shaft, said actuator mechanism comprising:

a motor mounted to said drive case, a first planetary gear set having: a first planetary gear set sun gear member, a first planetary gear set planet gear member, a first planetary gear set ring gear member, and a first planetary gear set planet gear carrier member, said first planetary gear set ring gear member coupled to and driven by said motor and said first planetary gear set planet gear carrier member fixed to said drive shaft, and a second planetary gear set having: a second planetary gear set sun gear member, a second planetary gear set planet gear member, a second planetary gear set ring gear member, and a second planetary gear set planet gear carrier member, said second planetary gear set sun gear member fixed to said first planetary gear set sun gear member, said second planetary gear set ring gear member fixed to said drive case, and said second planetary gear set planet gear carrier member coupled to said swashplate, whereby said first and second planetary gear sets are operatively interconnected and actuation of said motor adjusts the incline angle of said swashplate with respect to said drive shaft.

5. A cartridge swashplate actuator subassembly for a Stirling engine having a drive shaft, a drive case, an adjustment motor, and a swashplate, for adjusting the incline angle of said swashplate with respect to said drive shaft, comprising;

a first planetary gear set having: a first planetary gear set sun gear member, a first planetary gear set planet gear member, a first planetary gear set ring gear member, and a first planetary gear set planet gear carrier member, said first planetary gear set ring gear member coupled to and driven by said motor and said first planetary gear set planet gear carrier member fixed to said drive shaft, a second planetary gear set having: a second planetary gear set sun gear member, a second planetary gear set planet gear member, a second planetary gear set ring gear member, and a second planetary gear set planet gear carrier member, wherein said first and second planetary gear sets are operatively interconnected and actuation of said motor adjusts the incline angle of said swashplate with respect to said drive shaft, and a cartridge housing to be fixed to said drive case substantially containing said first and second planetary gear sets.

6. A swashplate actuator according to claim 5 wherein said first planetary gear set planet gear member and said second planetary gear set planet gear members are identically sized.

* * * * *